United States Patent
Thompson et al.

(10) Patent No.: US 10,427,045 B2
(45) Date of Patent: Oct. 1, 2019

(54) MULTI-VIEW (MV) DISPLAY SYSTEMS AND METHODS FOR QUEST EXPERIENCES, CHALLENGES, SCAVENGER HUNTS, TREASURE HUNTS AND ALTERNATE REALITY GAMES

(71) Applicant: Misapplied Sciences, Inc., Redmond, WA (US)

(72) Inventors: David Steven Thompson, Redmond, WA (US); Albert Han Ng, Redmond, WA (US); Paul Henry Dietz, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 223 days.

(21) Appl. No.: 15/648,128

(22) Filed: Jul. 12, 2017

(65) Prior Publication Data

US 2019/0015747 A1 Jan. 17, 2019

(51) Int. Cl.
*A63F 13/52* (2014.01)
*A63F 13/25* (2014.01)
(Continued)

(52) U.S. Cl.
CPC .............. *A63F 13/52* (2014.09); *A63F 13/25* (2014.09); *A63F 13/53* (2014.09); *G09G 3/002* (2013.01);
(Continued)

(58) Field of Classification Search
CPC .. G09G 5/14; G09G 2320/0626; G09G 3/002; H04N 13/351; H04N 13/324; A63F 13/25; A63F 13/52; A63F 13/53
See application file for complete search history.

(56) References Cited

U.S. PATENT DOCUMENTS

| | | |
|---|---|---|
| 5,855,425 A | 1/1999 | Hamagishi |
| 5,949,581 A | 9/1999 | Kurtenbach et al. |

(Continued)

FOREIGN PATENT DOCUMENTS

| | | |
|---|---|---|
| EP | 2 685 735 A1 | 1/2014 |
| WO | 02/24470 A1 | 3/2002 |

(Continued)

OTHER PUBLICATIONS

International Search Report, dated Feb. 25, 2019, for International Application No. PCT/US2018/059859, 14 pages.

(Continued)

*Primary Examiner* — David Duffy
*Assistant Examiner* — Ankit B Doshi
(74) *Attorney, Agent, or Firm* — Seed IP Law Group LLP

(57) ABSTRACT

A multi-view display quest system includes a multi-view (MV) display including one or more MV pixels, wherein each MV pixel is configured to emit beamlets in different directions in a beamlet coordinate system; an input node configured to receive a first attribute of a first quest player or of a first viewing zone and, optionally, a second attribute of a second quest player or of a second viewing zone; and a system controller. The system controller defines the first and second viewing zones relative to the MV display in a viewing zone coordinate system, determines a mapping that translates between the viewing zone coordinate system and the beamlet coordinate system, associates first and second quest related contents with the first and second viewing zones based at least on the first and second attributes, and controls the MV display to project first and second images generated from the first and second quest related contents to the first and second quest players at the first and second viewing zones, respectively.

23 Claims, 9 Drawing Sheets

(51) Int. Cl.
  *A63F 13/53*     (2014.01)
  *G09G 3/00*      (2006.01)
  *H04N 13/324*    (2018.01)
  *H04N 13/351*    (2018.01)
  *G09G 5/00*      (2006.01)
  *G09G 5/14*      (2006.01)

(52) U.S. Cl.
  CPC .............. *G09G 5/00* (2013.01); *G09G 5/14* (2013.01); *H04N 13/324* (2018.05); *H04N 13/351* (2018.05); *G09G 2320/068* (2013.01); *G09G 2320/0626* (2013.01); *G09G 2320/0666* (2013.01)

(56) References Cited

U.S. PATENT DOCUMENTS

| | | |
|---|---|---|
| 6,339,421 B1 | 1/2002 | Puckeridge |
| 6,377,295 B1 | 4/2002 | Woodgate et al. |
| 7,001,023 B2 | 2/2006 | Lee et al. |
| 7,462,104 B2 | 12/2008 | De Cesare |
| 7,602,395 B1 | 10/2009 | Diard |
| 7,990,498 B2 | 8/2011 | Hong |
| 8,461,995 B1 | 6/2013 | Thornton |
| 9,080,279 B2 | 7/2015 | Jun et al. |
| 9,396,588 B1 | 7/2016 | Li |
| 9,715,827 B2 | 7/2017 | Ng et al. |
| 9,743,500 B2 | 8/2017 | Dietz et al. |
| 9,792,712 B2 | 10/2017 | Ng et al. |
| 2003/0065805 A1 | 4/2003 | Barnes, Jr. |
| 2003/0115096 A1 | 6/2003 | Reynolds et al. |
| 2003/0156260 A1 | 8/2003 | Putilin et al. |
| 2004/0252374 A1 | 12/2004 | Saishu et al. |
| 2005/0093986 A1 | 5/2005 | Shinohara et al. |
| 2005/0195330 A1 | 9/2005 | Zacks et al. |
| 2009/0109126 A1 | 4/2009 | Stevenson et al. |
| 2009/0273486 A1 | 11/2009 | Sitbon |
| 2010/0002079 A1 | 1/2010 | Krijn et al. |
| 2010/0085517 A1 | 4/2010 | Hong |
| 2010/0207961 A1 | 8/2010 | Zomet |
| 2010/0214537 A1 | 8/2010 | Thomas |
| 2010/0246018 A1 | 9/2010 | Yu |
| 2011/0159929 A1 | 6/2011 | Karaoguz et al. |
| 2011/0169863 A1 | 7/2011 | Kawai |
| 2011/0216171 A1 | 9/2011 | Barre et al. |
| 2011/0242298 A1 | 10/2011 | Bathiche et al. |
| 2011/0304613 A1 | 12/2011 | Thoresson |
| 2012/0026157 A1 | 2/2012 | Unkel et al. |
| 2012/0062565 A1 | 3/2012 | Fuchs et al. |
| 2012/0105445 A1 | 5/2012 | Sakai et al. |
| 2012/0114019 A1 | 5/2012 | Wallace et al. |
| 2012/0140048 A1 | 6/2012 | Levine |
| 2012/0218253 A1 | 8/2012 | Clavin |
| 2012/0268451 A1 | 10/2012 | Tsai et al. |
| 2012/0300711 A1 | 11/2012 | Wang et al. |
| 2013/0013412 A1 | 1/2013 | Altman et al. |
| 2013/0093752 A1 | 4/2013 | Yuan |
| 2013/0169765 A1 | 7/2013 | Park et al. |
| 2013/0182083 A1 | 7/2013 | Grossman |
| 2013/0282452 A1 | 10/2013 | He |
| 2013/0298173 A1 | 11/2013 | Couleaud et al. |
| 2014/0015829 A1 | 1/2014 | Park et al. |
| 2014/0035877 A1 | 2/2014 | Cai et al. |
| 2014/0061531 A1 | 3/2014 | Faur et al. |
| 2014/0111101 A1 | 4/2014 | McRae |
| 2014/0300711 A1 | 10/2014 | Kroon et al. |
| 2014/0313408 A1 | 10/2014 | Sharma et al. |
| 2014/0316543 A1 | 10/2014 | Sharma et al. |
| 2015/0020135 A1 | 1/2015 | Frusina et al. |
| 2015/0042771 A1 | 2/2015 | Jensen et al. |
| 2015/0049176 A1 | 2/2015 | Hinnen et al. |
| 2015/0062314 A1 | 3/2015 | Itoh |
| 2015/0085091 A1 | 3/2015 | Varekamp |
| 2015/0092026 A1 | 4/2015 | Baik et al. |
| 2015/0198940 A1 | 7/2015 | Hwang et al. |
| 2015/0229894 A1 | 8/2015 | Dietz |
| 2015/0279321 A1 | 10/2015 | Falconer et al. |
| 2015/0293365 A1 | 10/2015 | Van Putten et al. |
| 2015/0334807 A1 | 11/2015 | Gordin et al. |
| 2015/0356912 A1 | 12/2015 | Dietz |
| 2016/0012726 A1 | 1/2016 | Wang |
| 2016/0210100 A1 | 7/2016 | Ng et al. |
| 2016/0212417 A1 | 7/2016 | Ng et al. |
| 2016/0224122 A1 | 8/2016 | Dietz et al. |
| 2016/0227201 A1 | 8/2016 | Ng et al. |
| 2016/0261837 A1 | 9/2016 | Thompson et al. |
| 2016/0261856 A1 | 9/2016 | Ng et al. |
| 2016/0293003 A1 | 10/2016 | Ng et al. |
| 2016/0341375 A1 | 11/2016 | Baker |
| 2016/0341377 A1 | 11/2016 | Eddins |
| 2016/0364087 A1* | 12/2016 | Thompson ........... H04N 13/351 |
| 2016/0366749 A1 | 12/2016 | Dietz et al. |
| 2016/0371866 A1 | 12/2016 | Ng et al. |
| 2017/0155891 A1 | 6/2017 | Hu et al. |
| 2017/0205889 A1 | 7/2017 | Ng et al. |
| 2018/0115772 A1 | 4/2018 | Thompson et al. |
| 2018/0277032 A1 | 9/2018 | Ng et al. |
| 2018/0357981 A1* | 12/2018 | Ng ........................ G09G 5/14 |
| 2019/0019218 A1 | 1/2019 | Thompson et al. |
| 2019/0028696 A1 | 1/2019 | Dietz et al. |

FOREIGN PATENT DOCUMENTS

| | | |
|---|---|---|
| WO | 2013/183108 A1 | 12/2013 |
| WO | 2016/118622 A1 | 7/2016 |
| WO | 2016/141248 A1 | 9/2016 |

OTHER PUBLICATIONS

International Search Report, dated Jun. 21, 2018, for International Application No. PCT/US2018/024024, 3 pages.
International Search Report, dated Jun. 3, 2016, for International Application No. PCT/US2016/014122, 3 pages.
International Search Report, dated May 12, 2016, for International Application No. PCT/US2016/020784, 4 pages.
International Search Report, dated Sep. 29, 2016, for International Application No. PCT/US2016/037185, 4 pages.

* cited by examiner

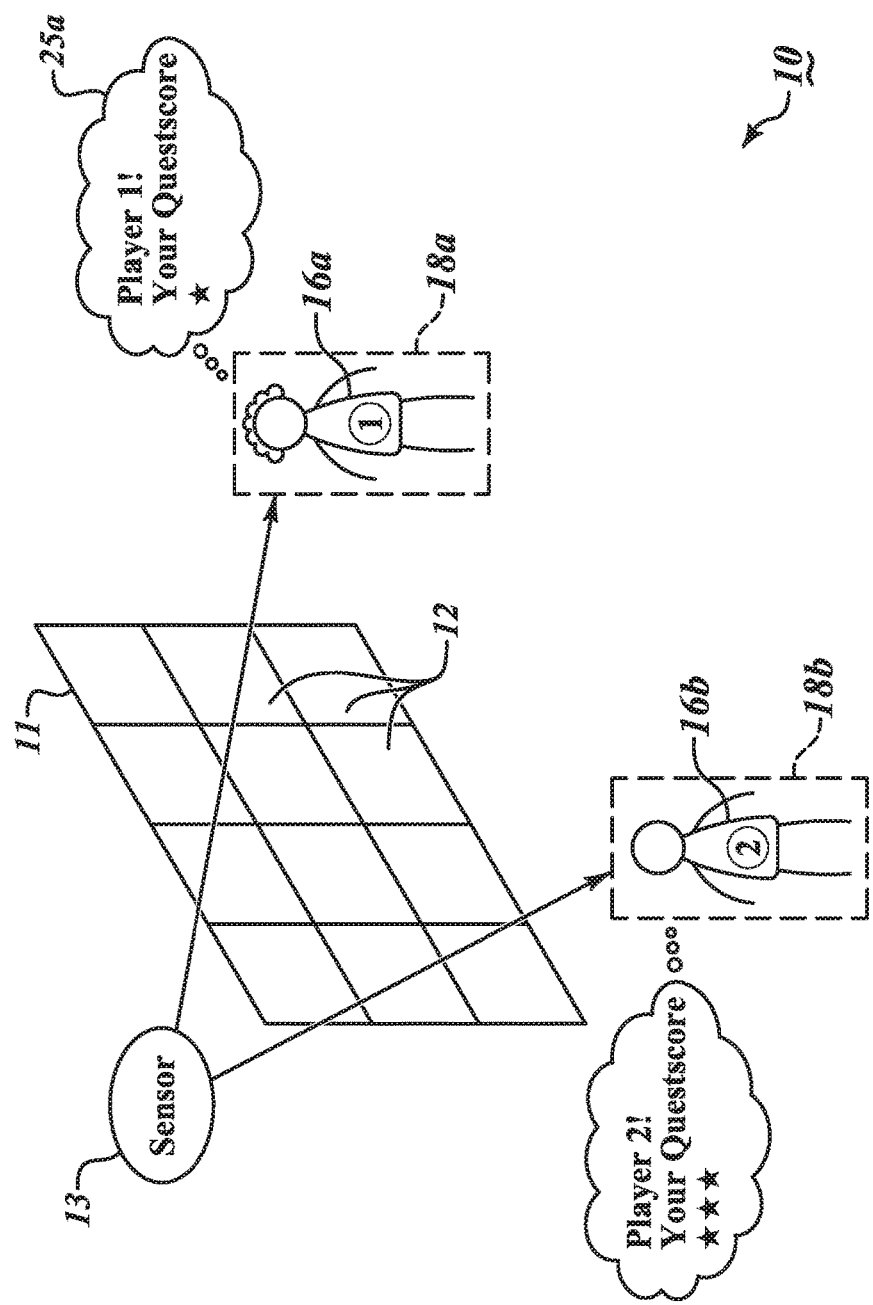

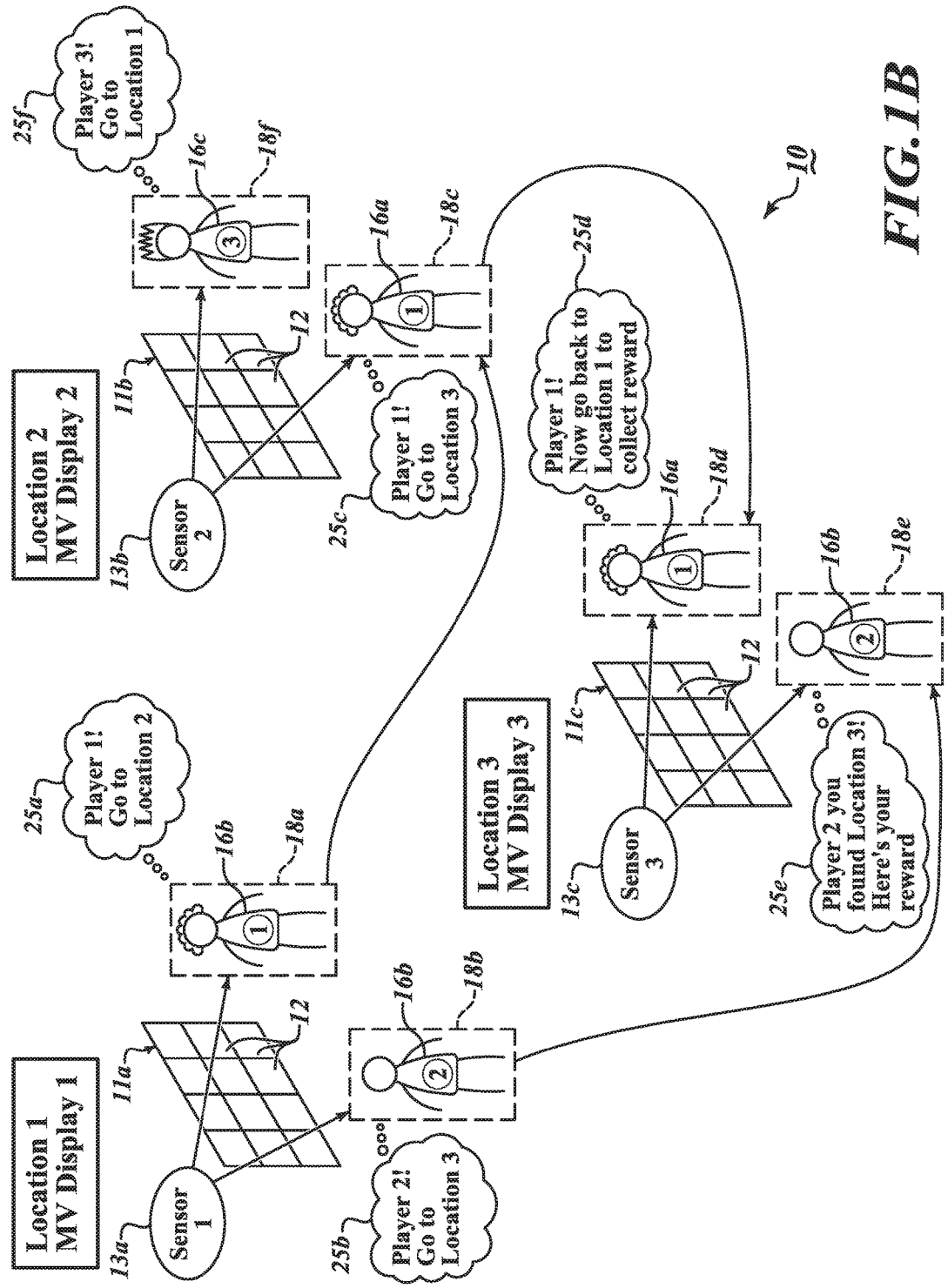

MULTI-VIEW (MV) DISPLAY SYSTEMS AND METHODS FOR QUEST EXPERIENCES, CHALLENGES, SCAVENGER HUNTS, TREASURE HUNTS AND ALTERNATE REALITY GAMES

BACKGROUND

Technical Field

This disclosure relates to multi-view (MV) display systems and methods for quest experiences, challenges, scavenger hunts, treasure hunts, alternate reality games, etc., which utilize a multi-view (MV) display capable of forming multiple images respectively visible to multiple quest players located in multiple viewing zones relative to the MV display (hence a different image shown to a different player), to facilitate and support multiple quests pursued by the multiple quest players independently of each other, or a single quest pursued by a quest player while others around him are oblivious to the quest.

Description of the Related Art

Applicant has previously proposed a multi-view display including one or more multi-view (MV) pixels, wherein each MV pixel is configured to emit beamlets (individually controllable beams) in different directions. Some details of the MV display are disclosed in co-assigned and co-pending U.S. patent application Ser. No. 15/469,220, titled "DISPLAY SYSTEM AND METHOD FOR DELIVERING MULTI-VIEW CONTENT", which is incorporated by reference herein. The MV display is controlled by a processor, which determines multiple viewing zones and associate multiple contents with the multiple viewing zones, respectively. For each of multiple images generated from the multiple contents, the processor identifies a bundle of beamlets from the MV pixels of the MV display directed to one viewing zone to form the image. The bundle of beamlets directed to one viewing zone to form one image is different from the bundle of beamlets directed to another viewing zone to form another image. The processor outputs control signaling for the MV pixels, wherein the control signaling defines color and brightness of each of the beamlets in each bundle to project the corresponding image to the corresponding viewing zone. The MV pixel(s), in response to the control signaling, project the multiple images to the multiple viewing zones, respectively.

The present disclosure is directed to providing novel multi-view display quest systems and methods that support quest experiences, challenges, scavenger hunts, treasure hunts, alternate reality games, etc., which utilize one or more MV displays arranged in a physical space to guide or direct multiple quest players through their respectively customized quest experiences independently of each other, but perhaps simultaneously, or a single quest player through his quest experience while keeping others around him oblivious to the quest.

BRIEF SUMMARY

According to an exemplary embodiment, a multi-view display (MVD) quest system is provided, which includes a multi-view (MV) display including one or more MV pixels, wherein each MV pixel is configured to emit multiple beamlets in different directions in a beamlet coordinate system. The MVD quest system also includes an input node which, in operation, receives a first attribute of a first quest player or of a first viewing zone. The MVD quest system further includes a system controller, which is coupled to the MV display and the input node. The system controller defines the first viewing zone located relative to the MV display in a viewing zone coordinate system, determines a mapping that translates between the viewing zone coordinate system and the beamlet coordinate system, and associates a first quest related content with the first viewing zone based at least on the first attribute. The system controller, for a first image generated from the first quest related content, using the mapping, identifies a bundle of beamlets from the one or more MV pixels of the MV display directed to the first viewing zone to form the first image. The system controller outputs control signaling for the MV pixels, wherein the control signaling defines color and brightness of each of the beamlets in the bundle to project the first image to the first viewing zone.

In further embodiments, the input node of the MVD quest system further receives a second attribute of a second quest player or of a second viewing zone. The system controller of the MVD quest system defines the second viewing zone located relative to the MV display in the viewing zone coordinate system, and associates a second quest related content with the second viewing zone based at least on the second attribute. The system controller, for a second image generated from the second quest related content, using the mapping, identifies a bundle of beamlets from the one or more MV pixels of the MV display directed to the second viewing zone to form the second image. The bundle of beamlets directed to the first viewing zone to form the first image visible to the first quest player is different from the bundle of beamlets directed to the second viewing zone to form the second image visible to the second quest player. The system controller outputs control signaling for the MV pixels, which defines color and brightness of each of the beamlets in the bundle to project the second image to the second viewing zone.

According to various embodiments, each of the first and second attributes may be one or more of: a presence of the quest player, a location of the quest player, a characteristic of the location of the quest player, an aggregate characteristic of a team the quest player belongs to, externally-observable characteristics of the quest player, an externally-observable behavior of the quest player, a path of travel followed by the quest player, a speed of the quest player, biometric information of the quest player, demographic information of the quest player, preferences of the quest player, identity of the quest player, information or indication inputted by the quest player, quest history of the quest player, a location of the viewing zone, an environmental condition of the viewing zone, and any other characteristic of the viewing zone.

According to various embodiments, the MVD quest system may include a sensing system, coupled to the input node, which detects the first and second attributes. In further embodiments, the MVD quest system further includes first and second player surrogates (e.g., radio tags, smartphones, etc.) respectively associated with the first and second quest players and communicable with the sensing system. The sensing system detects the first and second attributes based on the first and second player surrogates.

In accordance with further embodiments, a method of hosting a multi-view display (MVD) quest is provided, which utilizes the MVD quest system described above. The method of hosting an MVD quest may be implemented in one or more of an entertainment venue, an amusement park, a gaming event, a retail venue, a dining venue, a tourism destination venue, a resort venue, a cruise ship, a sports venue, a recreation venue, an education venue, an enrichment venue, a cultural venue, a commercial event, a trade show, a promotional event, a marketing event, a public venue, and a transportation venue/system, as non-limiting examples. Further, the method of hosting an MVD quest may be implemented to facilitate one or more tasks involved in a quest including:

player and team assignment;
use of player devices;
matching a player with a player device;
distributing quest game materials;
directing players to begin their quest experiences;
managing player flow and distribution;
providing puzzles, clues and navigation;
acknowledging completion of a quest;
rewarding a quest achievement with an effect; and
providing an epic quest payoff.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

FIG. 1A depicts an embodiment of a multi-view (MV) display quest system.

FIG. 1B depicts another embodiment of an MV display quest system.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

FIG. 1A is a diagram depicting one implementation example of a multi-view display (MVD) quest system 10. As used herein, the term "quest" broadly means various types of quest experiences, challenges, scavenger hunts, treasure hunts, alternate reality games, performing tasks, etc., which can be facilitated, supported, or hosted by the use of one or more MV displays of the MVD quest system 10 arranged in a physical venue. The MV display can present different images to different quest players located in different viewing zones relative to the MV display, to help facilitate different quests pursued by the different quest players simultaneously. The "quests" may be implemented in various categories of venues in the following list of non-limiting examples:

1. Entertainment venues (e.g., theme parks, water parks, aquariums, fairs, zoos, theaters, casinos, arcades, family centers);
2. Retail, Dining & Entertainment venues (e.g., shopping malls, downtown shopping districts, entertainment districts adjacent to theme parks and tourist areas);
3. Destination/Tourism venues (e.g., tourist destinations, nations' capitals, national and state parks and monuments, museum complexes, ports of call);
4. Resorts & Cruise Ships (e.g., resorts, cruise ships, water parks, amusement parks);
5. Sports and Recreation venues (e.g., gyms, fitness centers, stadiums, coliseums, golf courses, tennis clubs, miniature golf courses, spas, bowling alleys, shooting ranges);
6. Education, Enrichment, and Cultural venues (e.g., campuses, art installations, learning centers, training centers);
7. Commerce and Trade venues (e.g., trade shows, business complexes, industrial complexes, marketing events)
8. Public and Shared Spaces (anywhere there are people).
9. Transportation Venues and Systems (e.g., walkways, hiking trails, bike paths, airports, mass transit stations and networks, road and highway systems).

Figure 8:
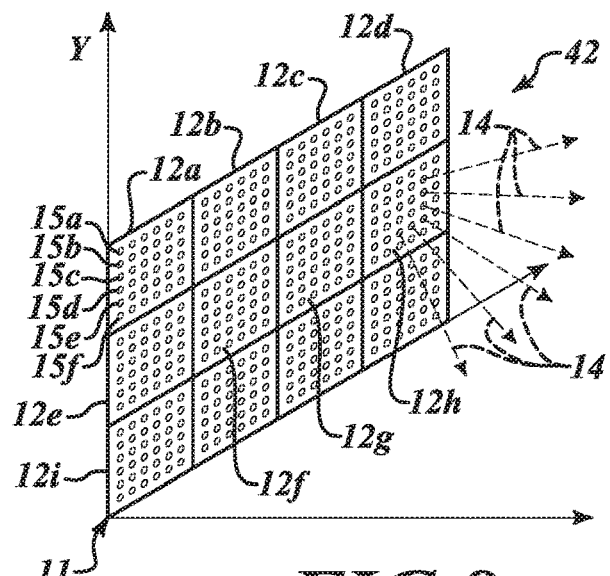
FIG. 8 depicts a beamlet coordinate system according to an embodiment.

In FIG. 1A, the MVD quest system 10 includes at least one multi-view (MV) display 11 composed of one or more MV pixels 12, wherein each MV pixel 12 is configured to emit beamlets (individually controllable beams) in different directions in a beamlet coordinate system (see FIG. 8). The MVD quest system 10 also includes an input node (see 17 in FIG. 3) configured to receive a first attribute of a first quest player 16a or of a first viewing zone 18a where the first quest player 16a is at and a second attribute of a second quest player 16b or of a second viewing zone 18b where the second quest player 16b is at. As will be more fully described below, the first and second attributes may be any characteristics associated with, or indicative of, the quest players 16a/16b and or the viewing zones 18a/18b, such as the presence or location of the quest players 16a/16b, the quest player's game scores or a quest path of travel, the quest player's action to trigger a quest event (e.g., a light show), or the location or other characteristics of the viewing zone 18a/18b. In some embodiments, the MVD quest system 10 may include a sensing system including one or more sensors 13, which is coupled to the input node 17 and configured to detect the first attribute and the second attribute. For example, the sensor 13 in FIG. 1A may be used to detect the presence (the first attribute) of the first quest player 16a and the presence (the second attribute) of the second quest player 16b.

In other embodiments, no sensors are required to detect and transmit the first and second attributes to the input node 17. Rather, the first and second attributes (e.g., the locations of the first and second viewing zones 18a/18b) may be configured during initial set-up of the MVD quest system 10 and stored in a memory device accessible by the processor via the input node 17 (see FIG. 3). In these embodiments, no sensors may be required to detect the first and second attributes in real-time. When the first and second viewing zones 18a/18b are set up for the MV display 11, for example, any quest player that enters the first viewing zone 18a will see a first image intended for the first viewing zone 18a and any quest player that enters the second viewing zone 18b will see a second image intended for the second viewing zone 18b. In this example, no attributes of the quest players 16a/16b need to be detected or sensed.

If the sensor 13 is employed, it may be used to locate and track the first and second quest players 16a and 16b, respectively labeled ① and ② in FIG. 1A, as they move around a quest venue in which one or more MD display 11 and one or more sensors 13 are arranged. The sensors 13 may be used to detect, sense, or collect not only the first and second attributes but any data useful to the MVD quest system 10.

In general, the sensors 13 allow for the MVD quest system 10 to identify, select, locate, or track quest players (or player surrogate devices such as their phones or the vehicles they are traveling in); locate, arrange, or update viewing zones respectively associated with the quest players; monitor, detect, or measure attributes or variables such as quest player behaviors (e.g., quest behavior, quest scores, a path of travel) or environmental conditions (e.g., quest congestion level, lighting condition, temperature at the quest venue); receive quest player inputs via a player surrogate device (e.g., via the player's smartphone); and so forth. For example, the sensor 13 may evaluate lighting, distance from the MV display to the quest player, and other criteria, which may be used by the MVD quest system 10 to adjust quest related content, from which an image is generated, for enhanced image visibility to the intended quest player. The sensor 13 may acquire data that can be analyzed and used to pre-program, schedule, or adjust various versions of quest related content and the layout of viewing zones. The sensor 13 may send information to an operator who can then make decisions and implement changes with the use of a user-interface (UI) device (see 19 in FIG. 3, to be described later) coupled to the MVD quest system 10. Further details of the sensor 13 will be described below.

Figure 5:
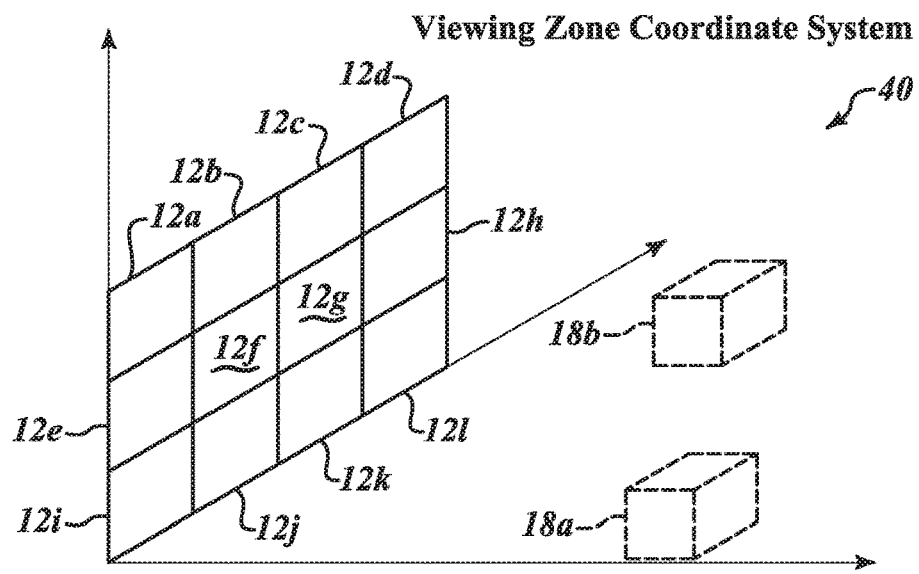
FIG. 5 depicts a viewing zone coordinate system in 3D according to an embodiment.

In FIG. 1A, a system controller of the MVD quest system 10, which is coupled to the MV display 11 and the input node 17, defines the first and second viewing zones 18a and 18b relative to the MV display 11 in a viewing zone coordinate system, to be described in reference to FIG. 5. The system controller determines a mapping that translates between the viewing zone coordinate system and the beamlet coordinate system (see FIG. 8). The system controller associates a first quest related content with the first viewing zone 18a based at least on the first attribute and associates a second quest related content with the second viewing zone 18b based at least on the second attribute. The system controller controls the MV display 11 to show a first image 25a generated from the first quest related content to the first quest player 16a at the first viewing zone 18a, and to show a second image 25b generated from the second quest related content to the second quest player 16b at the second viewing zone 18b. In the illustrated example, the first image 25a visible to the first quest player 16a reads "PLAYER 1! Your quest score [is] ＊" and the second image 25b visible to the second quest player 16b reads "PLAYER 2! Your quest score [is] ＊ ＊ ＊." The first quest related content, from which the first image 25a is created, is designed to facilitate the first quest player 16a's quest (e.g., a treasure hunt quest at an amusement park), and the second quest related content, from which the second image 25b is created, is designed to facilitate the second quest player 16b's quest (e.g., a mystery solving quest at the same amusement park, or the same treasure hunt quest but at a different difficulty level from the first quest player).

FIG. 1B is a diagram depicting another implementation example of an MVD quest system 10. The MVD quest system 10 in this example includes three MV displays 11a-11c each composed of one or more MV pixels 12, wherein each MV pixel 12 is configured to emit beamlets in different directions. The MVD quest system 10 also includes sensors 13a-13c configured to identify (e.g., detect) quest players 16a-16c (three players ①②③ are shown), wherein each quest player 16 is associated with a viewing zone 18. In the illustrated embodiment, the three sensors 13a-13c are provided in association with the three MV displays 11a-11c, respectively, though more or less MV displays and sensors may be provided. The sensors 13 may be provided not necessarily in association with any of the MV displays 11a-11c, as long as they can detect the first and second attributes, for example, to keep track of the presence of the quest players 16a-16c as they move around in a physical space in which the MV displays 11 and the sensors 13 are arranged.

Figure 2:
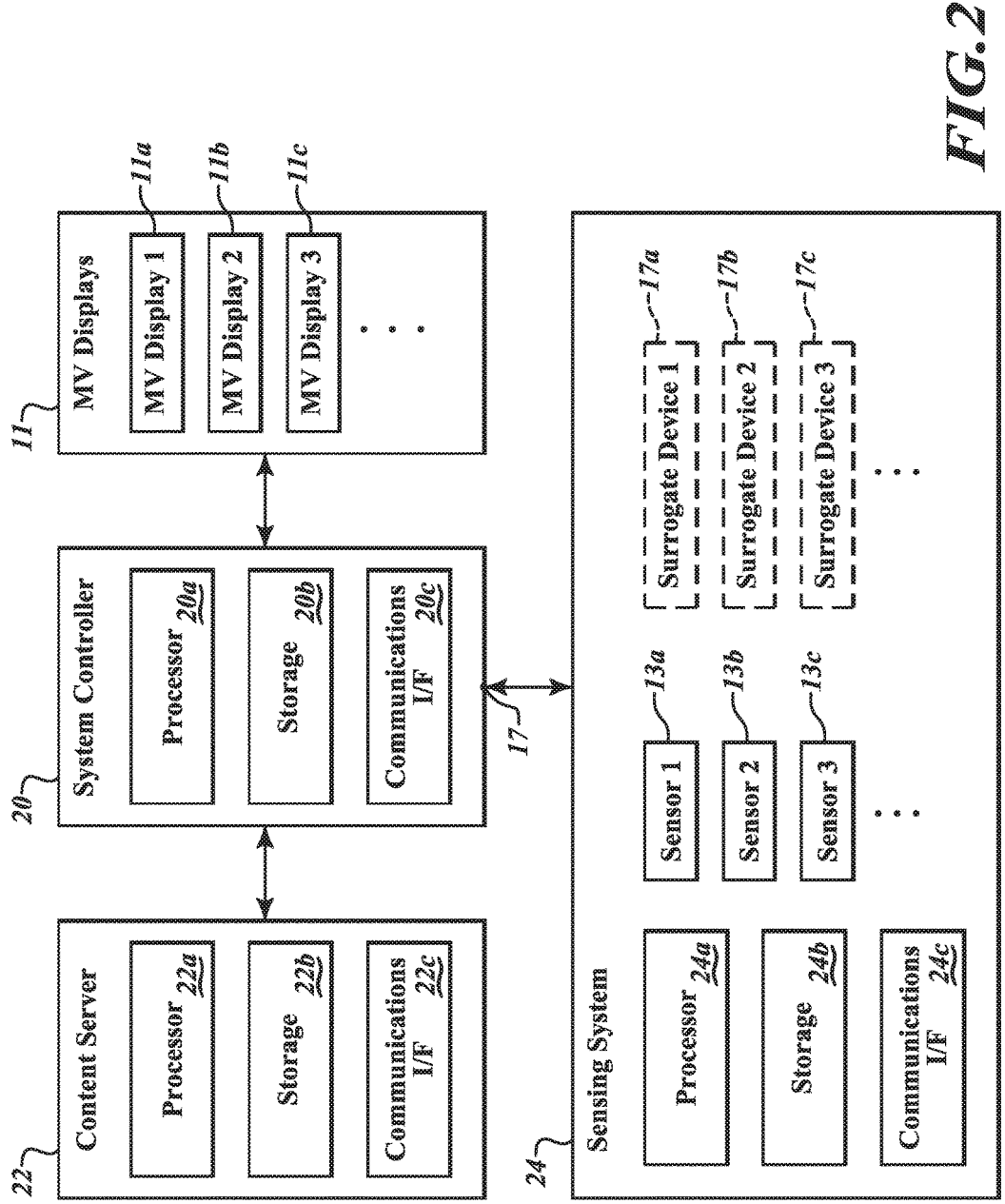
FIG. 2 depicts an embodiment of a system configuration of the MV display quest system of FIGS. 1A and 1B.

Referring additionally to FIG. 2, which depicts a sample system configuration of the MVD quest system 10 of FIG. 1A and FIG. 1B, the MV displays 11a-11c and the sensors 13a-13c are coupled to one or more processors 20a, 22a, 24a which, in the illustrated embodiment, are distributed, in a connected manner, among a system controller 20, a content server 22, and a sensing system 24 of the MVD quest system 10, although in other embodiments their functionalities may be distributed in different manners or may be consolidated into a single processor. The processors 20a, 22a, 24a may be a general-purpose computer capable of, among other tasks, executing an operating system, executing various device drivers, and executing specialized application software used in conjunction with various embodiments of the invention. In some embodiments, the processors 20a, 22a, 24a may be a special-purpose processor, collectively or individually.

The processor 20a, 22a, 24a is capable of populating, updating, using and managing data in a processor-accessible memory or storage 20b, 22b, 24b. Briefly, the storage 20b, 22b, 24b is a volatile storage device (e.g., RAM) and/or a non-volatile, non-transitory storage device (e.g., ROM, EPROM, EEPROM, hard drive(s), flash drive(s) or other solid state memory technology, CD-ROM, DVD) capable of storing, among any other information, data, device drivers and specialized application software which, when executed, enables the processor 20a, 22a, 24a to perform various computations and processing as described in the present disclosure. Various components in the processors 20a, 22a, 24a may be realized by hardware, software, or a combination of hardware and software, and each component may be partly or entirely realized by circuitry, a general-purpose processor or a special-purpose processor executing a software algorithm.

The sensing system 24 in the illustrated embodiment includes the sensors 13a-13c coupled to a processor 24a, a storage 24b, and a communications interface 24c. The sensors 13a-13c may be configured to detect the first attribute of the first quest player 16a or of the first viewing zone 18a and the second attribute of the second quest player 16b or of the second viewing zone 18b, and may also detect various other attributes, characteristics, or data usable for the MVD quest system 10. The sensors 13a-13c may be based on any suitable sensing technology including, without limitation, an optical sensor (e.g., camera, video camera, infrared sensor), an ultrasonic sensor, an acoustic sensor, a thermal imaging sensor, an electromagnetic (EM) interrogation system sensor capable of tracking an active object, a GPS system sensor capable tracking an active object, an RF sensor (e.g., RFID system including a reader capable of interrogating an RFID tag), an RF triangulation technique-based sensor, a radar sensor, interaction sensors (e.g., capacitive sensors to determine when a quest player touches a quest object such as a treasure chest), motion sensors to detect when a quest object is moved, sensors to detect presence of a personal device (a surrogate device 17a-17c) such as a cell phone, a smartphone or a tablet as well as to discover information from the personal device, vehicle detection and identification systems, etc. The sensing system 24 may work independently, or may draw on other sources of data to detect, distinguish or determine various attributes. For example, the sensing system 24 may detect a particular cell phone in range, and then query an external database to find the identity of the user (the quest player), her quest preferences, her quest history and scores, etc.

The multiple sensors 13a-13c may be suitably located relative to each other and relative to the MV displays 11a-11c to comprehensively detect the first and second attributes and any other data as the first and second quest players 16a/16b move around a physical setting such as a quest amusement park. For example, one or more cameras having suitable lenses and lighting may be used to recognize and locate multiple quest players 16a-16d to specify corresponding viewing zones 18a-18f, respectively. In some embodiments, the camera(s) may be depth-aware cameras, such as structured light or time-of-flight cameras, which can generate a depth map of what is being seen through the camera at a short range. The depth map may then be processed to approximate a 3D representation of what is being seen. In other embodiments, the camera(s) may be stereoscopic cameras and/or LIDAR sensors. Multiple sensors 13 of the same type, or of different types, may be used together. The sensing system processor 24a may run software applications (stored in the storage 24b) such as image processing software to process images captured by the sensors 13a-13c, software that associates each identified quest player with a viewing zone, software that discerns or extracts an attribute/characteristic of each identified quest player, etc. Any of a number of image processing techniques may be used including, without limitation, stitching/registration, morphological filtering, thresholding, pixel counting, image segmentation, face detection, edge detection, blob discovery and manipulation.

In some embodiments, the sensing system 24 further includes surrogate devices 17a-17c associated with the quest players 16a-16c, respectively, which can facilitate detection of the attributes (e.g., presence, location, identity, preferences, demographic information, quest play history, in-quest purchase history, etc., of each quest player). The surrogate devices 17a-17c may be, as non-limiting examples, tags (e.g., passive patterns such as QR code, active optical tags such as blinking IR LEDs, radio tags such as RFID tags, or ultrasonic tags, or kiosks) that the quest players may wear (e.g., incorporated in a badge, wrist band), mobile devices (e.g., smartphones, wands) functioning as communicable/trackable objects that the quest players may carry, conveyances that may transport the quest players such as vehicles, or any other types of markers that may serve as surrogates of the quest players. The surrogate devices may include a user-interface (e.g., a smartphone, a tablet computer, a laptop, or a smartwatch), via which the quest players may input information to the MVD quest system 10, such as the quest player's preferences for particular types of quests or activities, or the quest player's indication to trigger a quest related event (e.g., a light show). Such information entered by the quest players to their surrogate devices 17 is inputted as the attributes of the quest players into the MVD quest system 10. Also, the surrogate devices without a user-interface, such as a laser pointer or a "magic" wand, may be used by the quest players to input information (attributes of the quest players, such as indication by the quest player to trigger, change or adjust a quest related event) to the MVD quest system 10. As another example, a quest player may use a surrogate device (e.g., by moving a pointer relative to the MV display) to scroll-down or flip-through quest related content pages visible to the quest player on the MV display. Quest players could dynamically communicate with the MVD quest system 10 in generally three ways: 1) enter info/requests/preferences using a keyboard, touch screen, or microphone on a personal phone or other surrogate device, or at a station or kiosk, etc.; 2) scan or present a card, RFID chip, or quick-read code, etc., at a station or kiosk, or using a personal device such as a reader/scanner/camera on a smart phone, etc.; 3) through use of a pointer or wand or wearable or other intuitive device, or through gestures, or body positioning. In this last category, the wand or wearable device itself functions as a user interface for the quest player to communicate with the MVD quest system 10.

The sensors 13 may be configured to communicate with (e.g., receive signals from, interrogate, etc.) the surrogate devices 17a-17c respectively associated with the quest players using any suitable sensing or location technologies or protocols such as Bluetooth, Wi-Fi, cellular, optical, ultrasound, or RFID technology, EM interrogation technology, or GPS technology. The sensing system communications interface (I/F) 24c is responsible for supporting wireless communications among the sensors 13a-13c, the surrogate devices 17a-17c, the sensing system processor 24a, and the system controller 20 using any suitable communications protocols.

To facilitate different quests pursued by different quest players, the system controller 20, the content server 22, the sensing system 24 and the MV displays 11a-11c also may communicate with each other, in a network setting, via their respective communications interfaces (I/F) 20c, 22c, 24c, via any suitable medium including wireline and/or wireless medium, and via any suitable protocol (e.g., Bluetooth, Wi Fi, cellular, optical, ultrasound).

The system controller 20 is generally responsible for controlling the MVD quest system 10 to host (support) multiple multi-view display (MVD) quest events, such as quest experiences, challenges, scavenger hunts, treasure hunts and alternate reality games. The system controller 20 includes the processor 20a, which may run software applications (stored in the storage 20b) to define the first and second viewing zones 18a/18b located relative to the MV display 11a in a viewing zone coordinate system, determine a mapping that translates between the viewing zone coordinate system and the beamlet coordinate system (to be described fully below), and associate first and second quest related contents with the first and second viewing zones 18a/18b, respectively, based at least on the first and second attributes received via the input node.

In various exemplary embodiments, the system controller processor 20a is configured to associate multiple quest related contents with multiple viewing zones of a single MV display so as to present multiple images generated from the multiple quest related contents on the same MV display to the multiple quest players at the multiple viewing zones. The MV display thus can facilitate or support the multiple quest players' quests simultaneously. As used herein, an image presented to a quest player may be any of a static image, a stream of images (video), a text pattern, a lighting pattern, or any other expression of content that is visible to human eyes, as will be more fully described below.

The system controller processor 20a may include or be coupled to internal learning systems that allow for automated improvements and enhancements in the capability to associate optimal quest related contents with different viewing zone and, hence, the capability to select or design optimal quest experiences for multiple quest players. When the sensing system 24 is provided, the system controller processor 20a performs collecting, analyzing, and applying sensor data from the sensing system 24 to refine the first and second quest related contents to be presented to the first and second quest players to further facilitate their respective quests. In some embodiments, the system controller processor 20a may retrieve the first and second quest related contents from the content server 22. Briefly, the content server 22 includes a processor 22a, storage 22b which stores various contents (or content descriptors or content types), and communications interface (I/F) 22c. Alternatively or additionally, the content server 22 may include interfaces that feed content from content providers, such as a feed from a live camera, or a feed to a broadcasting station. Further alternatively or additionally, the controller processor 20a may generate the first and second quest related contents on the fly using computer-executable algorithms, which may be stored in the content server 22.

The system controller processor 20a is configured to determine (select or design) quest experiences for multiple quest players, for example by assigning the quest players to their quest roles, assigning quest game material or player devices to the quest players, directing the quest players to begin their quests, providing puzzles, clues and navigation to the quest players in their respective quests, managing player flow and distribution, acknowledging completion of a quest, rewarding a quest achievement with an effect, etc., all designed to guide each of multiple quest players through their own experiences, simultaneously.

The MVD quest systems and methods according to various exemplary embodiments are directed to supporting a category of gameplay in which participants ("quest players") engage in a "quest," such as performing tasks, solving challenges, collecting items, seeking locations, and/or undergoing experiences, perhaps to achieve an overarching objective. This type of gameplay is increasingly popular in theme parks and other public venues. A quest-type experience may be highly scalable from small to large and may be executed as a temporary installation for a marketing, seasonal, or special event as well as a permanent installation.

Many games, activities, experiences, and applications fall within this quest category, including but not exclusively: challenges, scavenger hunts, treasure hunts, alternate reality games (ARGs), puzzle hunts, egg hunts, geocaching, trigpointing, letterboxing, waymarking, and orienteering. Elements of these types of games are sometimes featured on TV reality shows such as The Amazing Race®. Broadly and non-inclusively speaking, quest activities involve participants following clues, directions, their wits, instincts, or random chance to collect objects, check in at locations, undertake experiences, and/or tackle tasks, challenges, or puzzles that may lead to a final goal, objective, or destination. A quest may be undertaken individually or in a group as a collaborative activity.

Elements of the game may take place both in the real-world using the MVD quest system 10 and in digital/online worlds including music or audio performances, movies, TV, video, or phone calls or on other "platforms" or mediums including paper materials, such as novels, storybooks, comic books, puzzle sheets and posters. For example, a quest player may solve puzzles and follow clues and directions provided in a book purchased in a store or provided online, which lead the quest player to puzzles, directions, and clues found on the MV displays 11a-11c of the MVD quest system 10, which lead to yet other puzzles, directions, and clues found on the MV displays 11a-11c and so forth. The quest player may need to access all these platforms (including the MV displays 11a-11c) and more to receive clues, puzzles, and directions, undertake challenges, and reach the end of the quest.

In some embodiments, there may be a competitive aspect in which quest players, individually or in teams, race to achieve a goal. In some embodiments, the quest game may be timed so that after a certain duration or at a certain time quest players are ranked by who solved the most puzzles, found the most items, undertook the most experiences, or got the furthest, for example. The quest activities might also be constructed so quest players collaborate as a community or "hive" to complete the game, by solving elements and sharing their contribution. In some embodiments, just completing the quest experience, without respect to competitors or a ticking clock, might constitute a victory.

The quest may be played in phases or at different levels. It may take branching routes so quest players have different experiences each time they play. Quest players themselves may participate in creating the quest game. The experience may continually change, expand, morph, and evolve. In some embodiments, the MVD quest system may have artificial intelligence capabilities, allowing it to teach itself to adapt and improve by observing, collecting, analyzing, and adjusting to how quest players, non-players, and the quest game environment itself react to the experience.

On a macro level, a quest experience may be a way of thinking about any situation where numerous places are to be visited, things collected, tasks accomplished, experiences undertaken, or challenges solved. For example, a family may think about their day at a theme park as a quest, with the objective of visiting as many attractions, shows, and restaurants as possible; encountering certain people, characters, or creatures; taking photos of specific places; and acquiring merchandise and collectibles. In this construct, family members may be thought of as playing roles as a team, optimizing the experience for themselves and the group.

To support an MVD quest, the system controller processor 20a of the MVD quest system 10 controls one or more MV displays 11a-11c (see FIGS. 1A and 1B) to show different (customized) images to multiple quest players from one MV displays 11 simultaneously, to facilitate the respective players' quests which are different from each other.

Figure 3:
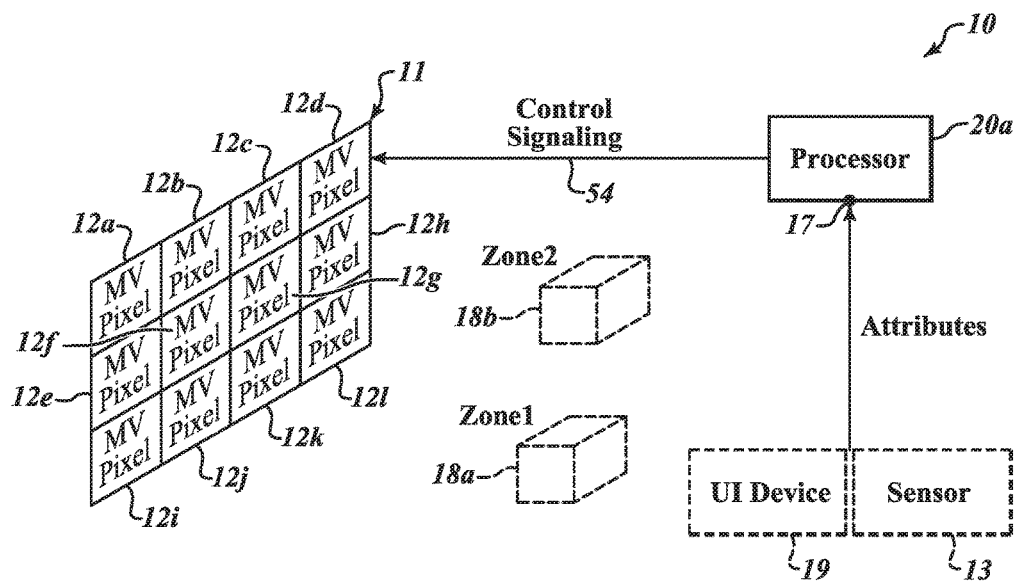
FIG. 3 depicts an embodiment of a multi-view display coupled to a processor.

FIG. 3 depicts an embodiment of a multi-view (MV) display 11, which is coupled to the system controller processor 20a, and optionally coupled to the sensor 13 and/or to a user-interface (UI) device 19 to collectively form the MVD quest system 10 of FIGS. 1A and 1B. The MV display 11 includes one or more multi-view (MV) pixels 12 (twelve MV pixels 12a-12l are included in the illustrated example), wherein each MV pixel 12 is configured to emit beamlets 14 in different directions, as additionally depicted in FIG. 8. "Beam lets" as used herein means individually controllable beams emitted from an MV pixel. FIG. 8 illustrates one of the MV pixels 12a-12l emitting multiple beamlets 14 in multiple directions. Unlike an image projector that emits a number of light beams to form an image on a screen, the beamlets 14 from each MV pixel 12 are intended to fall upon the eyes of multiple viewers, such that the multiple viewers respectively see different beamlets (e.g., in different colors and brightness) originating from the same MV pixel(s) 12. As a consequence, the appearance of each MV pixel 12 from the perspective of a viewer is dependent upon the angle at which the viewer looks to the MV pixel 12. For ease of illustration the MV pixel 12h in FIG. 8 is depicted to emit a few beamlets 14, though it should be understood that many more beamlets 14, for example in the order of millions, may be emitted from the MV pixel 12h and from any of the other MV pixels 12.

Referring back to FIG. 3, the MVD quest system 10 includes the input node 17 which, in operation, receives the first attribute of the first quest player 16a or of the first viewing zone 18a and the second attribute of the second quest player 16b or of the second viewing zone 18b. For example, the sensor 13 may be used to detect the first or second quest player 16a or 16b and transmit the detection signals indicative of the presence/location of the first and second quest players 16a and 16b as the first and second attributes to the input node 17. The system controller processor 20a may define, based on the received positions of the first and second quest players 16a/16b, the first and second viewing zones 18a/18b located relative to the MV display 11a in a viewing zone coordinate system. In the illustrated embodiment, the first and second viewing zones 18a ("ZONE 1") and 18b ("ZONE 2") are defined in a viewing zone coordinate system 40, as additionally depicted in FIG. 5. Definition of the first and second viewing zones 18a/18b may be performed in any consolidated or distributed processing configuration. For example, the sensing system processor 24a may define the identified locations of the first and second quest players 16a and 16b as the first and second viewing zones 18a and 18b, respectively, which may then be inputted to the processor 20a via the input node 17.

FIG. 5 illustrates the two viewing zones 18a and 18b, respectively specified as three-dimensional volumes (e.g., boxes), located relative to the one or more MV pixels 12a-12l of the MV display 11. Each viewing zone 18 defines an observation point at which an image formed by the one or more MV pixels 12a-12l is visible. The viewing zone 18 may be defined as a three-dimensional volume (a collection of observation points in 3D), as a two-dimensional area (a collection of observation points in 2D), or as a point.

The viewing zone coordinate system 40 may be any suitable coordinate system, such as a Cartesian coordinate system, or a polar coordinate system in which multiple viewing zones are positioned to surround the one or more MV pixels, for example. Any suitable 3D space modeling method may be used to define the viewing zone coordinate system 40, such as a map, point cloud, wire polygon mesh, and textured polygon mesh. In some embodiments, the viewing zone coordinate system 40 may be based on the physical dimensions of a viewing area in which the multiple viewing zones 18 are defined.

In some embodiments, the viewing zone coordinate system 40 may be within sight of a 3D sensor attached to the MV pixels (e.g., a depth sensor, a stereoscopic camera) and the viewing zone coordinate system 40 can be the 3D coordinate system of the 3D sensor. For example, a real-life 3D environment is scanned by a 3D sensor (e.g., stereoscopic camera) to derive the 3D viewing zone coordinate system 40, in which multiple viewing zones may be specified.

Figure 6:
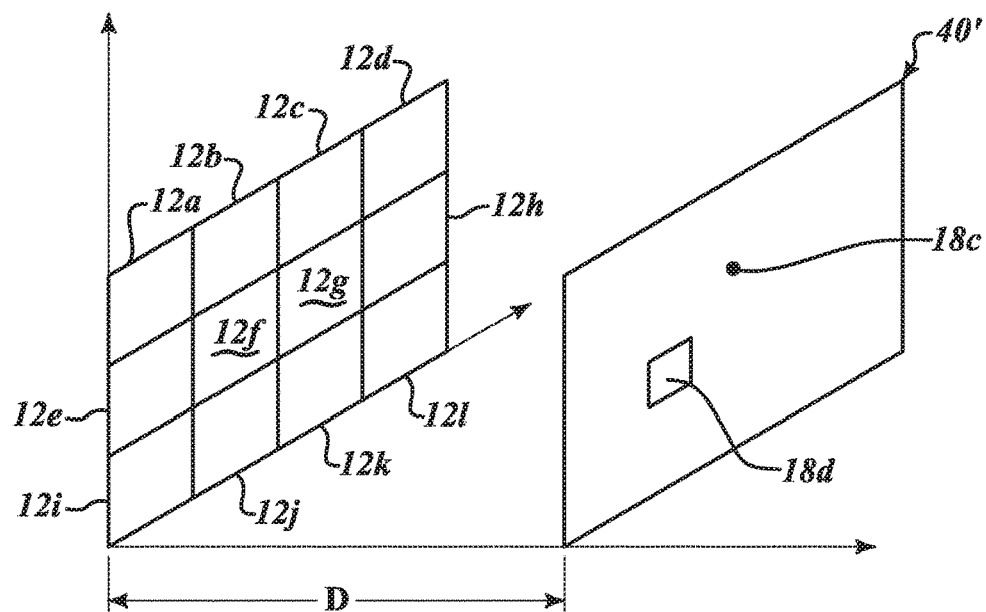
FIG. 6 depicts a viewing zone coordinate system in 2D according to an embodiment.

In other embodiments, the viewing area may be within sight of a 2D camera attached to the MV pixels, wherein the 2D camera is used as a sensor to identify the multiple quest players to be respectively associated with multiple viewing zones. In this case the viewing zone coordinate system 40 is based on the 2D pixel coordinate system of the 2D camera. For example, FIG. 6 illustrates a sample viewing zone coordinate system 40' in 2D, which may be based on the 2D pixel coordinate system of the 2D camera (not shown). In this example, the 2D viewing zone coordinate system 40' is set on a plane at a distance D from the one or more MV pixels 12a-12l. A point 18c or an area 18d may be specified in the 2D viewing zone coordinate system 40' to represent a viewing zone. It is noted that the 2D viewing zone coordinate system 40' may be in a shape other than a plane, such as a hemisphere or other non-planar surface. In some embodiments, it may be desirable for each point in the 2D viewing zone coordinate system 40' to have a unique viewing angle to the MV pixels 12a-12l, such that the bundle of beamlets directed towards each viewing zone, which is formed of one or more of those points each having a unique viewing angle, can be uniquely identified. Then, multiple non-overlapping viewing zones in the 2D viewing zone coordinate system 40' may be associated with (or "hit" by) mutually exclusive bundles of beamlets.

Figure 7A:
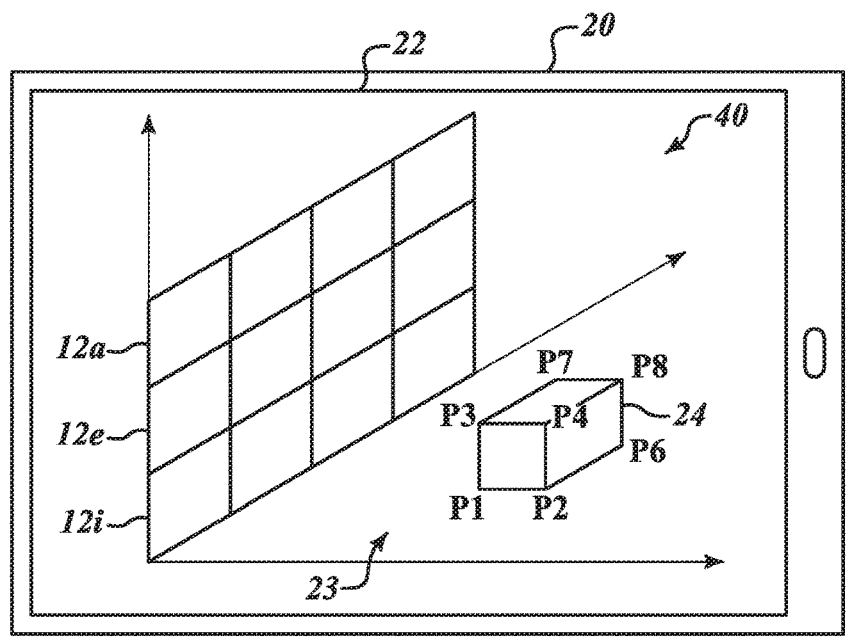
FIG. 7A depicts a sample screen view of a user interface device usable to specify multiple viewing zones in a viewing area relative to the MV display.

Multiple attributes of multiple quest players or of multiple viewing zones may be received via the input node 17 in various ways. According to some embodiments, the MVD quest system 10 includes the UI device 19 (see FIG. 3) which, in operation, receives an operator specification of the attributes of the multiple viewing zones 18 and transmits the attributes to the processor 20a via the input node 17. FIG. 7A illustrates a sample UI device 19, which includes a screen 22 (e.g., touchscreen) capable of displaying a representation of a viewing area 23 relative to the one or more MV pixels 12a-12l in the viewing zone coordinate system

40. The UI device 19 in these embodiments may be any of a tablet computer, as depicted in FIG. 7A, a laptop or desktop computer, or any electronic device that includes a screen (e.g., smartphone) and is capable of running a viewing zone specification application configured to permit specification of multiple viewing zones 18 in the viewing area 23. The operator may specify a viewing zone in the viewing area 23 in the viewing zone coordinate system 40 via the screen 22 (e.g., touchscreen) or keyboard or any other input device (not shown) of the UI device 19. The operator of the UI device may be a quest operator who sets up the MVD quest system 10 for quest players, or any of the quest players himself.

The operator may specify each viewing zone graphically, for example, by "drawing" a point, a 2D shape (e.g., a polygon, circle, oval, freeform shape) and/or a 3D shape (e.g., a box, sphere) that represents an observation point or represents (e.g., encloses) a collection of observation points. In the illustrated example of FIG. 7A, the operator has drawn a 3D shape of a box 24 that encloses a collection of observation points, from which a particular image should be visible. The graphically-input multiple viewing zones 18 may be represented as shapes or other indicia superimposed on the viewing area 23 on the screen of the UI device 19. Additionally or alternatively, the operator may specify the multiple viewing zones 18 by text, for example, by entering the coordinates of the vertices (P1-P8) of a box 24 that defines each viewing zone via a keyboard of the UI device 19.

Another procedure to lay out or define viewing zones may be aided by use of a camera or cameras on or near the MV display, which captures the areas and vantage points from which the MV display may be seen. Using such procedure, the viewing zone designer (e.g., operator of the MVD quest system 10) may consider environmental criteria, such as obstructions, number of people, quest player positioning, context, lighting conditions, and other variables when defining the viewing zones 18a/18b.

In various embodiments, the UI device 19 allows for an initial mapping or definition of viewing zones and the assignment of various quest related contents to the viewing zones, respectively. The UI device 19, perhaps in combination with the sensing system 24, may also allow for the timed, triggered, random, or real-time re-mapping of the viewing zones (perhaps by the quest player himself). Other viewing-zone definition procedures may include, as non-limiting examples, identifying viewing zones by moving over them with a location-sensing technology; by pointing to the viewing zones or the boundaries of the zones with a laser, light, or other means; by quest players establishing their location using a device, gesture, command, identifier, or other means; by using markers, reflectors, sensors; or by referencing a map, blueprint, or computer model.

In some embodiments, the UI device 19 need not include a screen capable of displaying a viewing area, for example, when the operator may not require a visualization of the viewing area in order to specify attributes of multiple viewing zones. In these embodiments, the UI device 19 need only include a UI component configured to receive the operator specification of attributes of multiple viewing zones. The UI component may be, without limitation, a keyboard or keypad on which the operator may type indications (e.g., seat numbers or position section numbers in front of an MV display) corresponding to viewing zones; a microphone into which the operator may speak indications of viewing zones; a touch/gesture-sensitive pad on which the operator may tap/gesture indications of viewing zones; an optical pointer the operator may use to point into the viewing area to specify each viewing zone, etc.

Additionally or alternatively, the operator (who may be the quest player himself or a different individual) may use the UI device 19 to specify attributes of multiple quest players by text, for example, by entering the quest player location, the quest player preferences, the quest player's quest history, etc. In these embodiments where the operator is the quest player himself, the UI device 19 may correspond to the surrogate device 17a-17c that forms part of the sensing system 24 in FIG. 2.

Figure 7B:
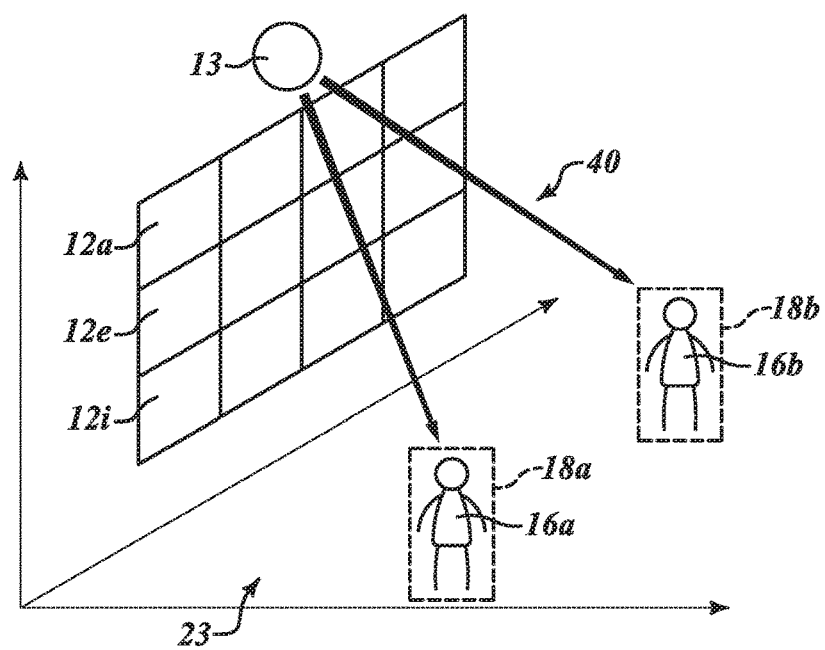
FIG. 7B depicts sample use of a sensor to specify multiple viewing zones based on multiple quest players whose locations are identified by the sensor.

As described above, the MVD quest system 10 may include a sensor 13 configured to detect attributes of the quest players 16 or of the viewing zones 18 and to send the detected attributes to the processor 20a via the input node 17, as shown in FIG. 3. FIG. 7B illustrates a sample sensor 13, which can identify (e.g., detect) locations of multiple quest players 16a and 16b, wherein the detected locations may be used to define the multiple viewing zones 18a and 18b in the viewing zone coordinate system 40.

In the illustrated example of FIG. 7B, the sensor 13 detects locations of the quest players 16a/16b, and specifies the detected locations of the quest players as the multiple viewing zones 18a and 18b. For example, a point, a 2D shape and/or a 3D shape may be assigned to each detected quest player 16 (e.g., a 3D box that encloses the quest player 16), and the assigned point, 2D shape and/or 3D shape may be used to define the viewing zone 18 for the quest player 16. The processing to specify multiple viewing zones based on the locations of the quest players 16a/16b identified by the sensor 13 may be performed by a processor of the sensor 13 and/or the system controller processor 20a of the MVD quest system 10.

In further embodiments, the sensor 13 may be configured to identify (e.g., pick up) further attributes of the viewing zone, such as audio (e.g., speech or other sound made by a quest player or quest player surrogate), temperature (e.g., heat emanating from a quest player or quest player surrogate), etc. The identified attributes may be used, for example, by a zones-and-contents association module 36 of the processor 20a, to be described below, to select or generate appropriate quest related content for the viewing zone (e.g., a cold drink advertisement selected/generated for a quest player in a high-temperature viewing zone).

FIG. 8 schematically depicts the beamlet coordinate system 42, which may be any suitable coordinate system such as a Cartesian coordinate system and a polar coordinate system. The beamlet coordinate system 42 identifies each of the beamlets emitted from each MV pixel 12, which follows a specific propagation path. For example, the propagation path of each beamlet may be defined by the beamlet's origin in the MV pixel and the (unit) vector that defines its propagating direction, or may be characterized by a combination of angles such as azimuth $\alpha$ and altitude $\beta$ angles formed by the beamlet. As further examples, any suitable 3D space modeling method may be used to define the beamlets' propagation paths in the beamlet coordinate system 42, such as a point cloud method that specifies a set of data points that form each propagation path or a voxel data method that specifies a set of voxels (a volume having unit x-y-z dimensions) that form each propagation path. Other 3D modeling methods may be used, such as a 3D map, wire polygon mesh, and textured polygon mesh. In some embodiments, as illustrated in FIG. 8, the beamlet coordinate system 42 explicitly identifies each of the beamlets by the beamlet's origin 15a, 15b, 15c . . . , in each MV pixel 12a, wherein each beamlet's origin is implicitly associated with its propagation path. In other embodiments, the beamlet coordinate system 42 may explicitly identify each of the propagation paths of the beamlets.

In some embodiments, the propagation path of each beamlet may be found based on a geometric model of the one or more MV pixels. For example, the geometric definitions of and relationships among the beamlets of an MV pixel may be found in a factory via calibration measurements, or may be inferred from the opto-mechanical design of the MV pixel, such as a known radial distortion of a lens included in the MV pixel. In various embodiments, the beamlets (e.g., the sources of the beamlets) in each MV pixel are arranged in a geometric array (e.g., 2D array, circular array). Propagation paths of the beamlets arranged in a geometric array can be geometrically defined using any suitable mathematical techniques including, without limitation, linear interpolation; linear extrapolation; non-linear interpolation; non-linear extrapolation; Taylor-series approximation; linear change of reference frame; non-linear change of reference frame; polynomial, spherical and/or exponential models; and trigonometric manipulation. As a particular example, once the propagation paths of selected beamlets are geometrically defined, suitable interpolation techniques may be used to find the propagation paths of the beamlets between those geometrically-defined beamlets. In other embodiments, the propagation path of each beamlet may be found by flashing patterns on the MV pixels (e.g., by selectively turning on and off the beamlets on each MV pixel) to uniquely encode every beamlet, and capturing the images of the flashing patterns using a camera placed in a viewing area of the MV pixels. The captured images can then be plotted onto the beamlet coordinate system 42 to geometrically define respective propagation paths of the beamlets. Various encoding patterns may be used as the flashing patterns, including, without limitation, Gray-code patterns, non-return-to-zero (NRZ) digital sequences, amplitude-shift-keyed (ASK) bits, maximum-length sequences, and shift-register sequences.

Although beamlets 14 are depicted in the accompanying figures as simple lines with arrowheads indicating their directions of emission, they can have an angular component and can be in any shape. Thus, characterization of the beamlet as a simple line is an approximation, which is a valid model in some embodiments but in other embodiments the beamlet may be modeled as having a shape similar to the beam from a search light, for example. In various exemplary embodiments, each beamlet 14 is wide/large enough such that both eyes of a quest player are expected to be within the beamlet 14 and the beamlet 14 falls upon both eyes of the quest player. Thus, the quest player sees the same beamlet 14 (e.g., the same color and brightness) with both of the eyes. In other embodiments, each beamlet 14 is narrow/small enough such that two different beamlets 14 are individually controlled to fall upon two eyes of a quest player, respectively. In this case the quest player sees two beamlets 14 of possibly different colors and/or brightness with his/her two eyes, respectively.

Figure 4:
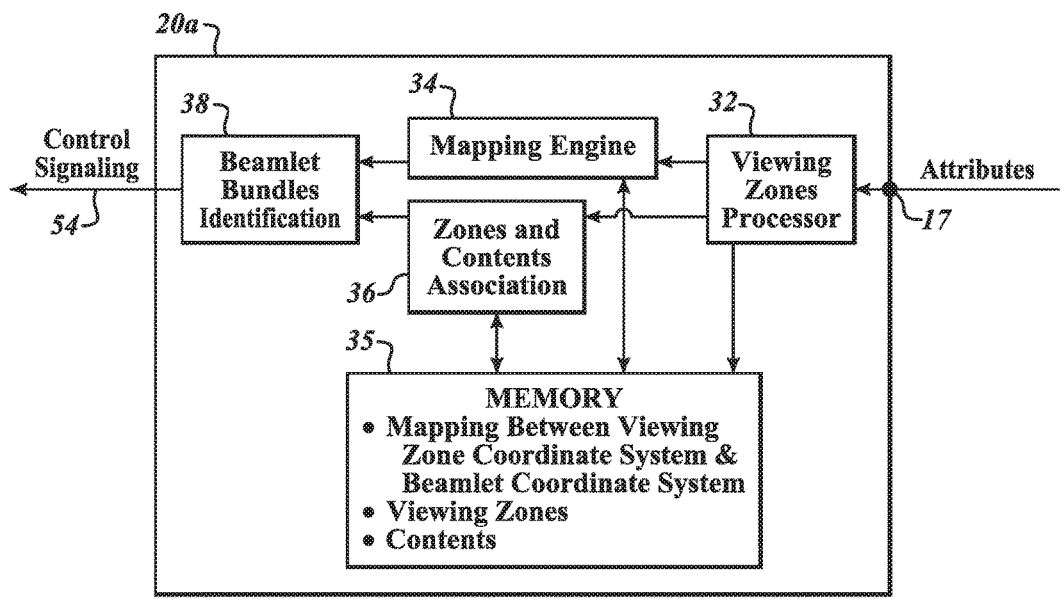
FIG. 4 depicts an embodiment of the processor of FIG. 3.

The processor 20a is capable of populating, updating, using and managing data in a processor-accessible memory 20b/35, which is illustrated as part of the processor 20a in FIGS. 2 and 4 though may be provided external to the processor 20a in some embodiments. Although the memory 35 is illustrated as a single device in FIG. 4, in various embodiments, the memory 35 may be divided into multiple storage devices.

The processor 20a receives, via the input node 17, the first and second attributes of the multiple quest players 16a and 16b or of the multiple viewing zones 18a and 18b, for example, from the UI device 19 (see FIG. 7A) or from the sensor 13 (see FIG. 7B).

The processor 20a associates first and second quest related contents with the multiple viewing zones 18a and 18b based at least on the first and second attributes. This may be done by associating the multiple contents themselves with the multiple viewing zones 18a and 18b, or by associating multiple content descriptors, such as multiple content providers (e.g., live stream sources, cable channels of quest related material, gamer social websites) or multiple content types, with the multiple viewing zones 18a and 18b.

The processor 20a determines (e.g., identifies, accesses) a mapping that translates between the viewing zone coordinate system 40 (FIG. 5) and the beamlet coordinate system 42 (FIG. 8). In various embodiments, a mapping between the viewing zone coordinate system 40 and the beamlet coordinate system 42 is generated and stored (or pre-stored) in the memory 35, which the processor 20a may access. In other embodiments, the processor 20a may generate a mapping between the viewing zone coordinate system 40 and the beamlet coordinate system 42 during runtime using a real-time calibration process.

The mapping may take any of various forms, such as a table or a mathematical relationship expressed in one or more translational functions. In some embodiments, the mapping may be based on registration of reference indicia (e.g., points, lines, shapes) defined in the viewing zone coordinate system 40 and in the beamlet coordinate system 42. For example, a first camera attached to the one or more MV pixels 12 is used to capture images of a viewing area 23 of the MV pixels 12. A registration device (not shown) including a second camera and a light source (e.g., an LED) is placed in the viewing area, and the light source is flashed, which is captured by the first camera of the MV pixels 12. The location of the flashing light in the viewing area as imaged by the first camera may serve as a reference in the viewing zone coordinate system 40 (which may be based on the coordinate system of the first camera). Encoding patterns (e.g., Gray-code patterns, non-return-to-zero (NRZ) digital sequences, amplitude-shift-keyed (ASK) bits, maximum-length sequences, shift-register sequences) are flashed on the one or more MV pixels (by selectively turning on and off the beamlets on each MV pixel) to uniquely encode every beamlet emitted from each MV pixel. The beamlet from each MV pixel that is captured by the second camera of the registration device placed in the viewing area may be identified (because each beamlet is uniquely encoded) and used as a reference in the beamlet coordinate system 42. The same process may be repeated with the registration device moved to different positions in the viewing area, to thereby obtain a set of references in the viewing zone coordinate system 40 and a set of references in the beamlet coordinate system 42. The mapping that translates between the two coordinate systems 40 and 42 may be found so as to register, align or otherwise correlate these two sets of references in the two coordinate systems. Any other registration techniques in image processing, such as automatic 3D point cloud registration, may also be used to perform the registration.

Figure 9A:
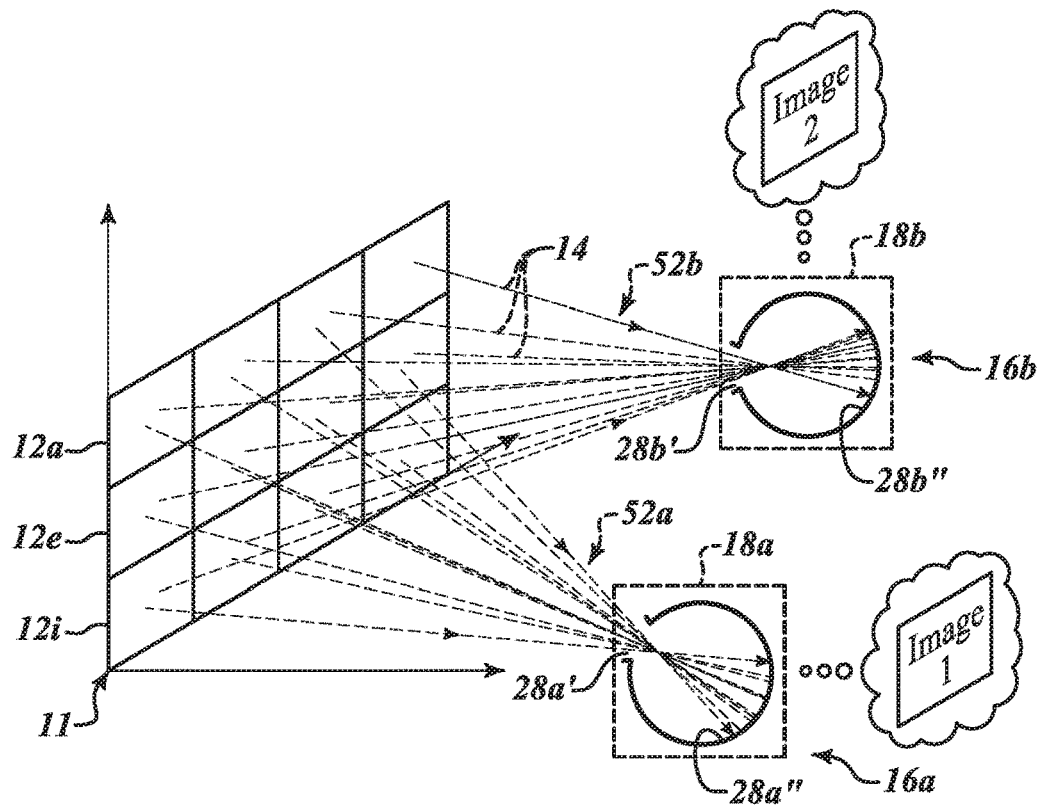
FIG. 9A depicts a sample process of using a mapping, which translates between the viewing zone coordinate system and the beamlet coordinate system, to identify a bundle of beamlets from the one or more MV pixels directed to each of the multiple viewing zones to form a corresponding image.

As illustrated in FIG. 9A, for each of multiple images ("IMAGE 1" and "IMAGE 2") generated from the multiple contents, the processor 20a, using (applying) the mapping determined (e.g., identified, accessed, generated) above, identifies a bundle of beamlets 14 from each of the MV pixels 12a-12l directed to one viewing zone 18 to form the image. As illustrated, each bundle 52a or 52b includes the beamlets 14 that are "hitting" the pupil 28a' or 28b' and spread to the retina 28a" or 28b" of the quest player 16a or 16b to form "IMAGE 1" or "IMAGE 2" in each quest player's brain. The bundle 52a of beamlets 14 directed to the pupil 28a' in one viewing zone 18a to form one image "IMAGE 1" in the quest player 16a's brain is different from the bundle 52b of beamlets 14 directed to the pupil 28b' in another viewing zone 18b to form another image "IMAGE 2" in the quest player 16b's brain. As shown in FIG. 3, the processor 20a outputs control signaling 54 for the MV pixels 12a-12l. The control signaling 54 defines color and brightness (and any other imaging parameters as desired) of each of the beamlets 14 in each bundle 52 to project the corresponding image to the corresponding viewing zone 18. The MV pixels 12a-12l, in response to the control signaling 54 from the processor 50, project the multiple images to the multiple viewing zones, respectively.

Figure 9B:
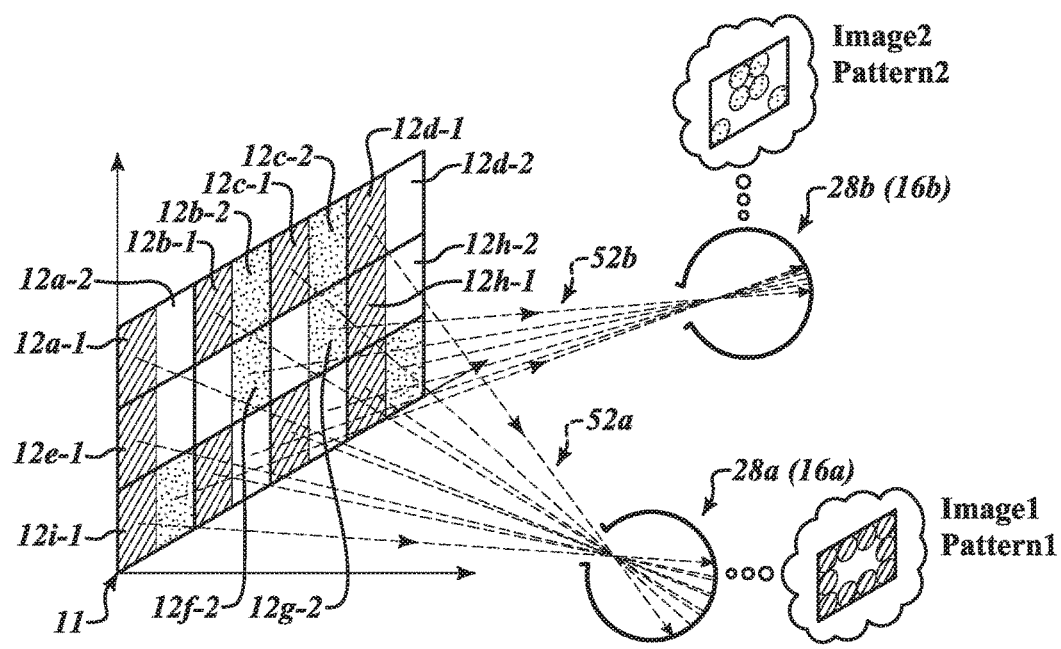
FIG. 9B depicts an example in which the MV pixels project different bundles of beamlets to different viewing zones, respectively, to present different images (IMAGE 1 and IMAGE 2 having different patterns) to the eyes located at the viewing zones.
Figure 9C:
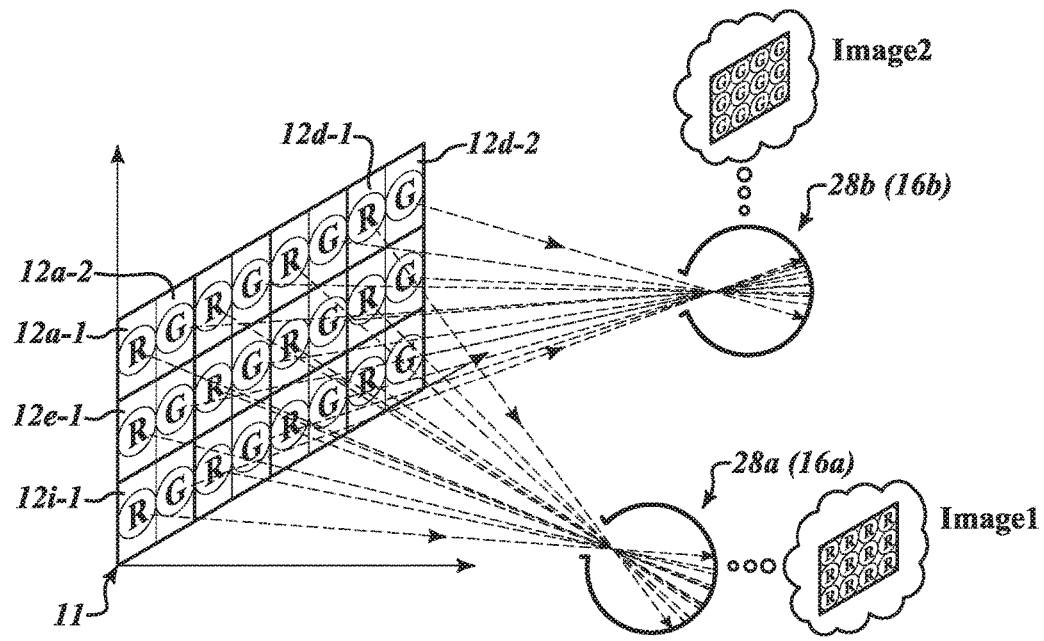
FIG. 9C depicts another example in which the MV pixels project different bundles of beamlets to different viewing zones, respectively, to present different images (IMAGE 1 and IMAGE 2 having different colors) to the eyes located at the viewing zones.

FIGS. 9B and 9C depict examples in which the MV pixels 12a-12l function to form two different images for two different quest players located at two viewing zones. In FIGS. 9B and 9C, each MV pixel is divided into two sections (e.g., 12a-1 & 12a 2), and it is assumed that the first sections (12a-1, 12b-1, 12c-1, et seq.) emit beamlets directed to the first viewing zone where the first quest player 16a (more specifically, the first quest player's eye 28a) is located, while the second sections (12a-2, 12b-2, 12c-2, et seq.) emit beamlets directed to the second viewing zone where the second quest player 16b (or the second quest player's eye 28b) is located. The control signaling 54 defines color and brightness of each of the beamlets 14 in each bundle to project the corresponding image to the corresponding viewing zone.

In FIG. 9B, the first sections of ten (10) MV pixels that form a rectangular pattern (12a-12d, 12e, 12h, and 12i-12l) emit beamlets having the color and brightness represented by "hatching" to the eye of the first quest player 16a such that the first quest player 16a sees IMAGE 1 having Pattern 1. The second sections of six (6) MV pixels (12b-12c, 12f-12g, 12i and 12l) emit beamlets having the color and brightness represented by "blotching" to the second quest player 16b such that the second quest player 16b sees IMAGE 2 having Pattern 2 that is different from Pattern 1 of IMAGE 1.

In FIG. 9C, the first sections of all twelve (12) MV pixels (12a-12l) emit beamlets having the color and brightness represented by "R" to the eye of the first quest player 16a such that the first quest player 16a sees IMAGE 1 in red. The second sections of all twelve (12) MV pixels (12a-12l) emit beamlets having the color and brightness represented by "G" to the second quest player 16b such that the second quest player 16b sees IMAGE 2 in green.

In each of these examples, a bundle of beamlets 14 that will "hit" one viewing zone is identified, and the color and brightness of each of the beamlets in the bundle are set, by the control signaling 54, to correspond to the content associated with the viewing zone so as to form an image based on the content at the viewing zone.

As used herein, "image" means anything that results from a pattern of illumination from the one or more MV pixels 12. The pattern of illumination is generated by turning "on" or "off" each of the beamlets emitted from each MV pixel 12 and/or controlling color and brightness (intensity) of each of the beamlets. Non-limiting examples of an image include any one or a combination of a static image, a stream of images (e.g., video), a text pattern (e.g., messages, signage), a lighting pattern (e.g., beamlets individually or collectively blinked, flashed, e.g., at different or varying speeds, at different brightness/dimness levels, at different brightness/dimness increase or decrease rates, etc., or otherwise turned "on" and "off"), and any other expression of content that is visible to human eyes.

An MV display 11 may consist of a single pixel, or an array of pixels arranged in a traditional display format, or a collection of irregularly placed pixels that may follow the contours of a skyline, the curves of a road, or the branches of a tree, as examples.

Each MV pixel 12 may be able to simultaneously project light rays of various colors and brightness. Similarly, each MV pixel may simultaneously direct light in some directions, and show no light at all in other directions. The MV pixels may resemble small projectors, or consist of lenses over a display panel, or consist of any of a variety of technologies able to achieve the desired effect of simultaneously sending different visual information in different directions from the same MV pixel or array of MV pixels, as described in the co-assigned patent application titled "DISPLAY SYSTEM AND METHOD FOR DELIVERING MULTI-VIEW CONTENT" incorporated herein above. In this manner, the color and brightness of each pixel, or the use of light or no-light, or other characteristics such as blinking, or fading and intensifying, or alternating between colors, may depend on the location of the quest player relative to the MV display. If an MV pixel is projecting the color red to the right, and the color green to the left, quest players simultaneously observing the same MV pixel will each see a different color depending on which side of the MV display they are standing. Likewise, an MV pixel may shine light in one direction but not another, so a person standing in one place sees a light, while a person in another place sees dark. Further, an MV pixel may appear to blink, or fade and intensify in brightness, or alternate between colors, at different rates when viewed from one location versus another location.

MV displays may be blended with regular displays, screens, projections, printed and painted surfaces, and other media. They may serve as an extension of other signage, where only a portion of the sign needs to have multi-view capabilities.

MV displays can be configured into many different shapes, forms, sizes, and configurations. For example, graphics, signals, guides, lights, and other forms of messaging and imagery can be incorporated into architecture, interiors, furnishings, landscaping, land forms, and other environmental features, elements, and surroundings.

In some embodiments, the control signaling 54 may define, in addition to color and brightness, other parameters of each of the beamlets 14 from each MV pixel 12, such as spectral composition, polarization, beamlet shape, beamlet profile, focus, spatial coherence, temporal coherence, and overlap with other beamlets. Specifically, beamlets generally do not have a sharp edge and thus adjacent beamlets may somewhat overlap. The degree of overlap may be controlled by one of the beamlet parameters.

The control signaling 54 for the MV pixels 12 may be output from the processor 20a via any suitable medium including wireline and/or wireless medium, and via any suitable protocol (e.g., Bluetooth, Wi-Fi, cellular, optical, ultrasound).

FIG. 4 illustrates details of the processor 20a of the MVD quest system 10 according to one embodiment. Various components 32, 34, 36 and 38 in the processor 20a of FIG. 4 may be realized by hardware, software, or a combination of hardware and software, and each component may be partly or entirely realized by circuitry, a general-purpose processor or a special-purpose processor executing a software algorithm.

The processor 20a receives the first attribute of the first quest player 16a or of the first viewing zone 18a and the second attribute of the second quest player 16b or of the second viewing zone 18b via the input node 17.

In the processor 20a, a viewing zones processor 32 is responsible for processing the first and second attributes to define the first and second viewing zones 18a and 18b. In some embodiments, the first and second attributes received via the input node 17 may be specification of the first and second viewing zones 18a and 18b as explicitly defined in the viewing zone coordinate system 40 on the UI device 19 by an operator. In other embodiments, the first and second attributes received via the input node 17 may be the locations of multiple quest players 16a and 16b as identified by the sensor 13. In these embodiments, the viewing zones processor 32 receives the identified locations of multiple quest players, and performs processing necessary to define the multiple viewing zones 18 based on the identified locations, such as by defining a point, a 2D shape, or a 3D shape that corresponds to each of the identified locations. The viewing zones processor 32 may use any of a number of image-processing techniques to process (e.g., recognize) the locations of multiple quest players (perhaps associated with surrogate devices 17) as identified by the sensor 13, such as stitching/registration, morphological filtering, thresholding, pixel counting, image segmentation, face detection, edge detection, and blob discovery and manipulation.

In various embodiments, the multiple viewing zones defined by the viewing zones processor 32 may be stored in the memory 35 to be accessible by various components of the processor 20a.

The zones-and-contents association module 36 running an association application associates multiple quest related contents with the multiple viewing zones 18, respectively, based at least on the multiple attributes received via the input node 17 and additionally and optionally on further attributes and data accessible by the zones-and-contents association module 36. The memory 35 may store the multiple quest related contents and/or content descriptors of the multiple quest related contents, or may store interfaces that feed to quest related content providers, or may store computer-executable algorithms, which the processor 20a may use to generate (create) the quest related contents to be associated with the multiple viewing zones 18.

The association program running on the zones-and-contents association module 36 is responsible for fetching, accessing, or creating multiple quest related contents for multiple viewing zones, respectively, based at least on the multiple attributes. The association program may refer to defined association rules to associate the multiple viewing zones 18 with multiple quest related contents. For example, quest related contents may be associated with the locations of the viewing zones relative to the MV display 11, so as to generate quest related images that are particularly selected as appropriate for display at those locations. As another example, quest related contents are associated with the quest players at the viewing zones, so as to generate quest related images that are particularly selected as appropriate for those quest players.

The attributes that may be used to select and associate quest related contents with viewing zones, respectively, may include, as non-limiting examples, the presence of the quest player, a location of the quest player, a characteristic of the location of the quest player (e.g., distance from the MV display), an aggregate characteristic of a team the quest player belongs to (e.g., team "BLUE" vs team "RED" that are competing against each other), externally-observable characteristics of the quest player (e.g., based on facial recognition), an externally-observable behavior of the quest player, a path of travel followed by the quest player, a speed of the quest player, biometric information of the quest player (e.g., temperature, heart rate, eye-tracking of the viewer), demographic information of the quest player, preferences of the quest player (e.g., as explicitly inputted by the quest player using the surrogate device 17 or the UI device 19, or implicitly inferred based on the quest player's game history or in-quest purchase history), identity of the quest player, information inputted by the quest player (e.g., via the surrogate device 17 or the UI device 19), game history and scores of the quest player, a location of the viewing zone, an environmental condition of the viewing zone (e.g., temperature), and a characteristic of the viewing zone (e.g., a spatial condition relative to surrounding structures).

The attributes of multiple quest players or of multiple viewing zones may be stored in one or more memory devices, which the processor 20a may access in order to associate multiple quest related contents with the multiple viewing zones. The attributes that may be stored include, as non-limiting examples, the location of the quest player, a characteristic of the location of the quest player, an aggregate characteristic of a team the quest player belongs to, externally-observable characteristics of the quest player, an externally-observable behavior of the quest player, a path of travel followed by the quest player, a speed of the quest player, biometric information of the quest player, demographic information of the quest player, preferences of the quest player, identity of the quest player, information inputted by the quest player, quest game history of the quest player, a location of the viewing zone, a spatial or environmental condition of the viewing zone, and a characteristic of the viewing zone.

In some embodiments, the zones-and-contents association module 36 may refer to an "external" attribute, which impacts the association of both the first and second quest related contents with the first and second viewing zones substantially equally. For example, an external attribute indicative of a crowd size/flow (e.g., a congested state in the quest venue) may impact the association process to assign the quest related contents to multiple viewing zones so as to disperse the quest players in the venue. As another example, an external attribute indicative of timing (e.g., close to the amusement park closing time) may impact the association process to add a special message to all quest players to finish up their quests soon. As yet another example, an external attribute indicative of an MV display environment (e.g., temperature rise) may impact the association process to address the environmental condition (e.g., to promote in-quest purchase of cold drinks or quest-themed sun glasses, etc., or to navigate the quest players to in-door facilities with air conditioners).

In some embodiments, multiple quest related contents to be associated with the multiple viewing zones 18 based on the first and second attributes, and optionally and additionally on external attributes, may be generated in real time by the zones-and-contents association module 36. For example, the association application running on the zones-and-contents association module 36 may generate quest related content (e.g., signage, a lighting pattern) in real time for each viewing zone as a function of the attributes using a suitable association algorithm.

The mapping engine 34 of the processor 20a determines (e.g., identifies, accesses, generates) a mapping that translates between the viewing zone coordinate system 40 and the beamlet coordinate system 42. In various embodiments, the mapping may be stored (or pre-stored) in the memory 35, in which case the processor 20a accesses the stored mapping.

Multiple mappings (e.g., one that translates from the viewing zone coordinate system 40 to the beamlet coordinate system 42, and another that translates from the beamlet coordinate system 42 to the viewing zone coordinate system 40) may be stored in the memory 35, and the mapping engine 34 may selectively access one or more suitable mapping(s) therefrom. In various embodiments, the mapping engine 34 determines (e.g., accesses) the mapping(s), and a beamlet-bundles identification module 38, to be described below, applies the mapping(s) to identify the bundle of beamlets that hit each viewing zone.

As described above, the mapping between the viewing zone coordinate system 40 and the beamlet coordinate system 42 may be pre-stored in the memory 35, or may be received into the memory 35 via the input node 17 at appropriate timings. For example, when the UI device 19 is used to specify the multiple viewing zones 18, the viewing zone coordinate system 40 used by the viewing zone specification application running on the UI device 19 may be used to generate a mapping, which may be received into the processor 20a together with the first and second attributes via the input node 17.

For each of multiple images generated from the multiple quest related contents (associated with the multiple viewing zones by the zones-and-content association module 36), using the mapping (determined/identified/accessed/generated by the mapping engine 34), the processor 20a identifies a bundle of beamlets from each of the MV pixels directed to one viewing zone to form the image. In the processor 20a, a beamlet-bundles identification module 38 running a bundle identification application is responsible for applying the mapping to identify the multiple bundles 52a, 52b of beamlets directed to the multiple viewing zones 18a, 18b to form the multiple images, respectively (see the examples of FIGS. 9A, 9B and 9C, described above). Generally, the bundle identification application, for each of the images, identifies a bundle of beamlets that "hit" or "land" on/in the corresponding viewing zone to form the image.

Referring back to FIGS. 1A and 1B, in some embodiments, the first and second quest related contents may be updated to generate an updated version of the first image 25a visible to the first quest player 16a, and likewise the second quest related content associated with the second viewing zone 18b may be updated to generate an updated version of the second image 25b visible to the second quest player 16b. For example, the first sensor 13a may sense that the first quest player 16a is moving from a first position to a second position relative to the first MV display 11a. Then the system controller processor 20a controls the first MV display 11a to project the updated version of the first image 25a to the first viewing zone 18a at the second position, after projecting the original first image 25a to the first viewing zone 18a at the second position. Alternatively, when the sensor 13a detects a new state of the first quest player 16a (e.g., the first quest player requesting certain information using his/her surrogate device), the MV display 11a may be controlled to project the updated version of the first image 25a to the first viewing zone 18a responsive to the first quest player's request. Thus, the first MV display 11a is capable of projecting changing images to each of the first quest player 16a and the second quest player 16b in addition to being capable of projecting different images to the first and second quest players 16a and 16b, respectively.

An individual who continuously looks at an MV display 12 while wandering through its various viewing zones will see a new (different) content whenever crossing into a new viewing zone. The content shown in each viewing zone can be customized—even to the point of continually reconfiguring the viewing zones, and continually reassigning the content. This means a viewing zone may be constantly adjusted so it follows an individual walking past an MV display, allowing that individual to see content intended for him/her when crossing the paths of other people looking at the same time at the same MV display. Meanwhile, these other people may be watching their own customized content.

FIG. 1B illustrates some implementation examples of the MVD quest system 10 to support or facilitate multiple quest players 16a-16c (three players ①②③ are shown). Due to the nature of MV displays, different quest related contents can be simultaneously displayed at different viewing zones by the same MV display when different quest scenarios (e.g., different quest players with different preferences or characteristics pursuing different challenges) are happening simultaneously. The ability to show different quest related contents on the same MV display simultaneously is one of key benefits of the present disclosure.

In the example of FIG. 1B, the system controller processor 20a receives, via the input node 17, the first attribute of the first quest player 16a or of the first viewing zone 18a at a first location ("Location 1") where the first MV display 11a ("MV display 1") is located. The first attribute may be, for example, the identity of the first quest player 16a standing at the first viewing zone 18a as sensed by the sensor 13a. Similarly, the controller processor 20a receives the second attribute of the second quest player 16b or of the second viewing zone 18b. The second attribute may be, for example, the identity of the second quest player 16b standing at the second viewing zone 18b as sensed by the sensor 13a. The processor 20a defines the first and second viewing zones 18a and 18b relative to the MV display 1 (11a) and associates (e.g., retrieves, feeds into, or generates) first and second quest related contents with the first and second viewing zones based at least on the first and second attributes. For example, the first and second quest related contents may be selected to generate first and second images 25a and 25b which are designed to facilitate the first and second quest player's quests simultaneously. In the illustrated example, the first image 25a reads "Player 1! Go To Location 2," prompting the first quest player 16a to move to a second location ("Location 2") where the second display 11b ("MV display 2") is located, which is different from the first location. On the other hand, the second image 25b reads "Player 2! Go To Location 3" to induce the second quest player 16b to move to a third location ("Location 3") where the third display 11c ("MV display 3") is located, which is different from the first location.

The first quest player 16a, upon viewing the first image 25a, moves to Location 2 where the second MV display 11b is located. The system controller processor 20a receives an attribute of the first quest player 16a, such as the identity of the first quest player 16a now standing at a third viewing zone 18c relative to the second MV display 11b, and associates a third quest related content with the third viewing zone 18c based at least on this attribute. In various embodiments, in addition to this attribute (the identity of the first quest player 16a), the processor 20a may consider further attributes of the first quest player 16a or of the third viewing zone 18c as sensed by the sensing system 24, as inputted by the first quest player 16a, or as retrieved from one or more storage devices accessible by the processor 20a (e.g., the first quest player's quest history, quest preferences, etc.) to further refine the third quest related content associated with the third viewing zone 18c. In the illustrated example, the third image 25c based on the third quest related content reads "Player 1! Go To Location 3." The first quest player 16a therefore looks for and moves to the third location ("Location 3") where the third MV display 11c ("MV display 3") is located. The system controller processor 20a, based on one or more attributes of the first quest player 16a or of a fourth viewing zone 18d where the first quest player 16a is at, controls the third MV display 11c to project a fourth image 25d generated from a fourth quest related content to facilitate the first quest player's quest. In the illustrated example, the fourth image 25d that the third MV display 11c shows to the fourth viewing zone 18d of the first quest player 16a (as sensed at the third location by the sensor 13c) reads "Player 1! Now Go Back To Location 1 To Collect Reward."

Still referring to FIG. 1B, the system controller processor 20a controls the MV displays 11a-11c to support or facilitate the second quest player's quest at the same time as it is supporting or facilitating the first quest player's quest. For example, while the first MV display 11a is showing the first image 25a to navigate the first quest player 16a to move from Location 1 to Location 2, the same first MV display 11a is showing the second image 25b to the second quest player 16b to navigate him to move from Location 1 to Location 3. The second quest player 16b then moves to Location 3 where the third MV display 11c is located. The system controller processor 20a, based on one or more attributes of the second quest player 16b or of a fifth viewing zone 18e where the second quest player 16b is standing as sensed by the sensor 13c, controls the third MV display 11c to project a fifth image 25e generated from a fifth quest related content to facilitate the second quest player's quest. In the illustrated example, the fifth image 25e that the third MV display 11c shows to the second quest player 16b at the fifth viewing zone 18e reads "Player 2, You Found Location 3! Here's Your Reward." The fifth image 25e may itself embody the reward, such as a visual or illumination show visible only to the second quest player 16b in the fifth viewing zone 18e.

While in the illustrated embodiment of FIG. 1B the first and second quest players 16a and 16b who both start their quests at the first MV display 11a are directed to the second and third MV displays 11b and 11c at the second and third locations that are different from each other, in some embodiments the second and third MV displays 11b and 11c may be the same display at the same location. In such embodiments, the first and second quest players 16a and 16b follow the same physical path from the first MV display 11a to the next MV display (11b/11c), while viewing different images at the first MV display 11a and viewing different images at the next MV display (11b/11c) to pursue different (e.g., customized or tailored) quests from each other.

Still referring to FIG. 1B, the system controller processor 20a may control the MV displays 11a-11c to facilitate yet another quest pursued by a third quest player 16c, who starts his quest at the second display 11b ("MV display 2") at the second location. The system controller processor 20a receives an attribute of the third quest player 16c or of a sixth viewing zone 18f where the third quest player 16c is at, and associates a sixth quest related content with the sixth viewing zone 18f based at least on the attribute and optionally additionally on further attributes of the third quest player 16c or of the sixth viewing zone 18f. The third MV display 11c projects a sixth image 25f, which reads "Player 3! Go To Location 1" generated from the sixth quest related content, which is designed to facilitate the third quest player's quest. The third MV display 11c shows the sixth image 25f to the third quest player 16c at the same time as it is showing the third image 25c to the first player 16a, thereby supporting multiple quests pursued by multiple quest players simultaneously.

Figure 10:
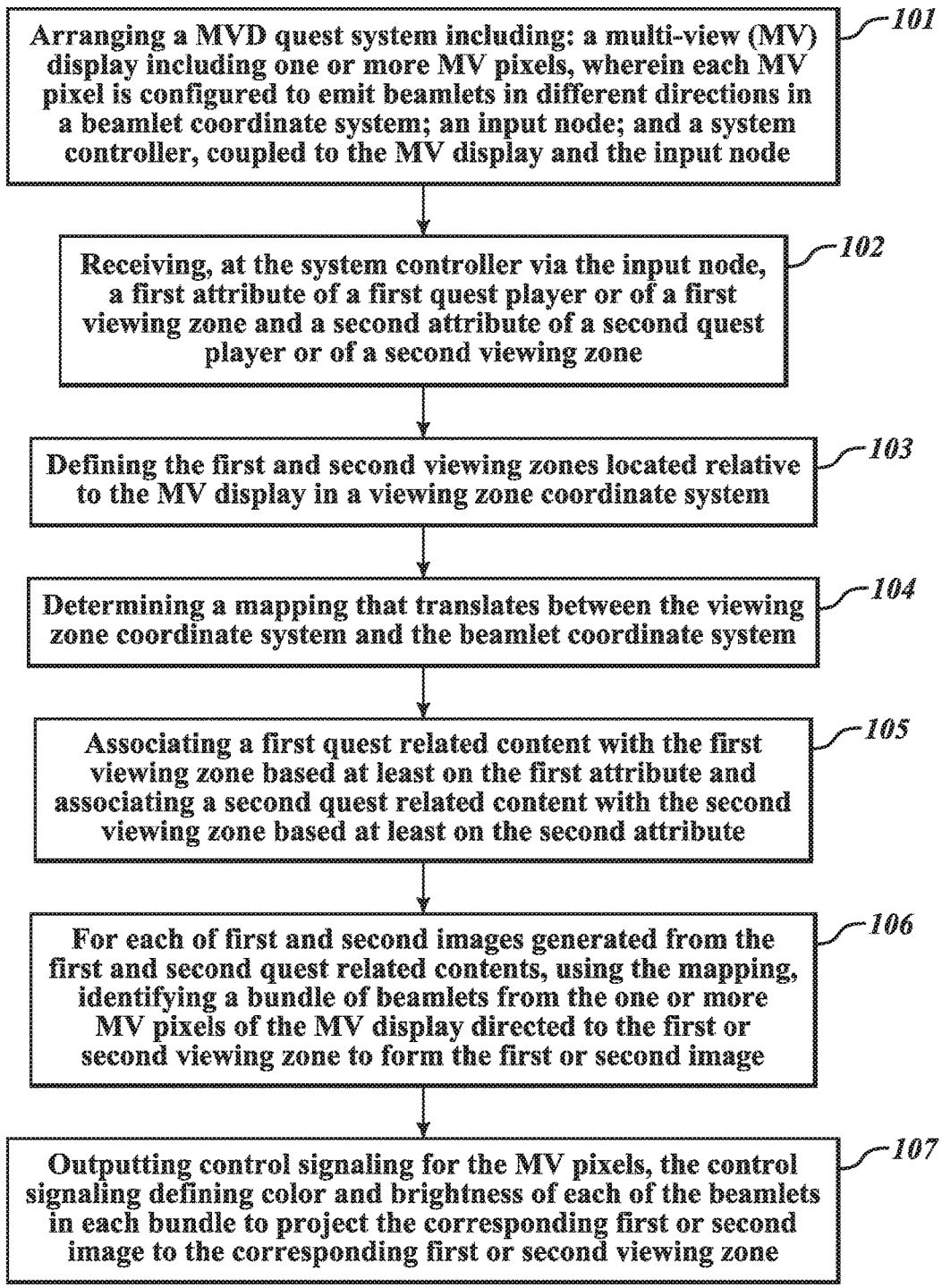
FIG. 10 is a flowchart depicting a method of hosting a multi-view display (MVD) quest (quest experiences, challenges, scavenger hunts, treasure hunts and alternate reality games, etc.) according to one embodiment.

FIG. 10 is a flowchart depicting a method of hosting a multi-view display (MVD) quest (e.g., quest experiences, challenges, scavenger hunts, treasure hunts, alternate reality games, etc.) according to one embodiment.

In step 101, an MVD quest system 10 as described above is arranged, which includes: a multi-view (MV) display 11 including one or more MV pixels 12, wherein each MV pixel 12 is configured to emit beamlets 14 in different directions in a beamlet coordinate system 42; an input node 17; and a system controller 20, which is coupled to the MV display and the input node.

In step 102, the system controller 20 receives, via the input node 17, a first attribute of a first quest player or of a first viewing zone and a second attribute of a second quest player or of a second viewing zone.

In step 103, the first and second viewing zones are defined relative to the MV display in a viewing zone coordinate system 40.

In step 104, a mapping is determined that translates between the viewing zone coordinate system and the beamlet coordinate system.

In step 105, a first quest related content is associated with the first viewing zone based at least on the first attribute, and a second quest related content is associated with the second viewing zone based at least on the second attribute.

In step 106, for each of first and second images generated from the first and second quest related contents, using the mapping, a bundle of beamlets from the one or more MV pixels of the MV display directed to the first or second viewing zone to form the first or second image is identified. The bundle of beamlets directed to the first viewing zone to form the first image visible to the first quest player is different from the bundle of beamlets directed to the second viewing zone to form the second image visible to the second quest player.

In step 107, control signaling for the MV pixels is outputted, wherein the control signaling defines color and brightness of each of the beamlets in each bundle to project the corresponding first or second image to the corresponding first or second viewing zone.

Technical Advantages

For companies that focus on costly physical environments to entertain the public, the quest games supported by the multi-view display quest systems and methods according to the present invention offer a "real world" alternative to home and portable electronic game systems in which players enjoy a highly-individualized experience within elaborate digital worlds. The ability to provide an individualized experience in a crowded, physical setting may be a high-priority goal of many venue-based entertainment companies.

Quest games allow these companies, whose offerings may include theme parks, resorts, water parks, cruise ships, casinos, and other recreation environments, to stay relevant as they compete with new generations of entertainment technologies. The quest games also solve a number of long-standing problems independent of competing with digital entertainment. Guests trying to enjoy themselves in crowded environments can be confronted with many unenjoyable conditions, such as long lines, inflexible schedules, and the feeling of being treated like a herd animal. Quest games can provide entertainment during wait times, can be enjoyed at times suited to each player, can transform a crowded environment into a fun game setting, and can allow a passive member of a herd/crowd to become an active individual taking control of his or her own experience.

An additional technical advantage achievable with the multi-view display quest systems and methods according to the present invention is the ability to more evenly spread demand at a venue so that popular areas become less crowded and underutilized areas carry more of the burden. Quest games can be designed to better leverage underappreciated portions of a venue, and to offer "interstitial" entertainment in the gaps between major attractions. Ideally, quest games can be adjusted in real-time to continually balance shifts in demand at crowded places.

Another technical advantage, particularly from the perspective of venues that rely on costly fixed assets, is the ability to attract repeat visitation. Quest games are a low-cost overlay to existing environments that can be frequently refreshed to attract repeat visitors that might otherwise be bored with the same, never-changing attractions. A theme park that has not introduced a new ride in several years can be renewed by the addition of a quest game.

In some embodiments, there may be a digital aspect to quest experiences in which participants alternate between on-line play and experiences in the physical world. These may be termed "Trans-Media" games, which feature multiple media platforms, possibly including both on-line activities as well as real-world settings and environments. They can be used to encourage visitation to certain web sites, and to blend the best of physical and digital entertainment experiences.

Quest games, especially those with digital elements, can be extended beyond the borders of any specific venue, to include the player's home, school, work, neighborhood, and other locations. This can be an important marketing tool in which the quest player's imagination is first captured in a familiar local environment, but to continue or complete the adventure the quest player must visit a theme park or shopping mall or other destination venue. If the game is expanded, or has layers, the player may be motivated to visit the venue repeatedly, and to pull others into the game. This provides a viral marketing effect. The very act of visiting a company-created web site to engage in the quest experience affords opportunities for marketing to the player, and for gathering information about customers.

Beginning in the 1970s it became the norm for theme parks and similar venues that had been designed around the principle of pay-for-play or ticket books to instead offer one-price admission. This approach allowed unlimited access to all levels of shows and attractions, without regard to their relative popularity or capacity. Instead of having to continually pay or provide a ticket for each show or attraction, visitors just paid once for everything. The marketing appeal of this was thought to outweigh the issues it created.

A primary problem resulting from this is uneven demand. This is caused by an increased appetite for popular attractions that previously required a more expensive ticket, and by a reduced interest in second- and third-tier attractions that had formerly been less expensive and therefore more appealing. This challenge may be addressed by enhancing less popular attractions with a quest game overlay. The game requires quest players to visit the lesser attractions, but not the high-demand attractions.

Another problem is that one-price-buys-all admission makes it difficult to upsell to guests who feel (reasonably) that all experiences should be included and no additional costs incurred. A solution to this is selling or renting a device, such as the ID device for each quest player, that has value in itself (such as a magic wand), but mainly serves to provide a differentiated quest experience that does not fall in the category of attractions promised for the single admission price. The device serves as a ticket or admission to the experience but can be sold as a souvenir, making it an acceptable way to request more money from visitors. As a bonus, these devices are a means of generating revenue from repeat guests who are seeking new experiences but, as a category, are less likely to buy souvenirs. Seasonal ticket holders—who pay once for multiple admissions—are an ideal market for this type of product. It requires them to pay more for new experiences and to acquire a souvenir they might not otherwise purchase.

In addition to the benefits offered to entertainment venues, quest experiences are valuable to companies and institutions seeking to instruct, educate, train, and enrich; and to those wishing to market, advertise, promote, and influence. They can provide fun overlays to such activities as exploring new places, seeking information, team building, and training, as well as creating "buzz" and reinforcing a message, brand, product, or service.

Yet another benefit is to broaden the appeal of experiences to include a wider range of ages, interests, and skills levels. For example, a typical museum might not hold the same fascination for all members of a family. And usually not all members of a family prioritize the same rides and activities at a theme park. Quest games can be tailored to each member of a party so everyone can engage in the same overall experience, but with individualized activities and challenges.

A very important benefit from a quest game can be the empowerment it gives children, who can feel left out while tagging along on a family outing. A quest overlay can provide them with insights they may choose to share with the rest of the party, making them authorities and contributors. Or they make gain more satisfaction by possessing secrets the others do not know. A quest gives them a sense of mission and purpose they can "own."

Individuals with psychological, emotional, physical, or other characteristics that differentiate them from the rest of their party, or the rest of the public, may also benefit from a quest overlay tailored to their interests, needs, capabilities, and conditions. For example, someone not able to ride a rollercoaster with their party might be entertained playing a quest game in the vicinity of the coaster while their party waits in line and rides the attraction. Or, someone with very specific interests can play a quest game associated with their area of fascination that overlays the broader range of experiences enjoyable to the rest of the party. The quest activities might be based on the specific set of senses—audio, visual, tactile, and so forth—possessed by the quest players, so they are fully engaged. A hard-of-hearing player may pursue a version of a quest game that does not necessitate audio. Similarly, mobility challenged players may play a version of the game optimized for persons in wheelchairs.

Elements of quest games may also be applied to work duties. For example, during their shift, police officers, security guards, inspectors, custodians, or maintenance/servicing personnel might be required to visit a string of locations or perform a series of tasks. There are various techniques to ensure they have done their job, received their instructions, or been guided on their route, that are similar to the ways these same objectives are achieved in quest games.

Quest games can be used for job orientation and other forms of testing or training. For example, a prospective employee or trainee might be required to seek a series of work locations and answer questions, perform tasks, or solve challenges associated with each place. When they have successfully completed the quest, they will have proved themselves ready for the next step.

The mechanics of a quest game might be applied to any situation where there is a desire to optimize for a sequence of activities, experiences, challenges, puzzles, tasks, or destinations. Non-limiting examples include doing as much as possible on a vacation, tour, shopping trip, convention trip, trade show visit, errand day, work day, and so forth.

Numerous aspects of these types of quest games and experiences can benefit greatly from capabilities offered by multi-view (MV) display systems. In some embodiments, MV display systems enable entirely new and important forms of gameplay that were not previously possible. Most importantly, they greatly expand the number of guests or quest players that can simultaneously enjoy a game, which is critical for using them in crowded venues.

Multi-view (MV) display systems make it possible to simultaneously show on the same display separate versions of content (such as lighting, effects, signaling, messaging, images, video, and media) that appear entirely different to different people, depending on their location relative to the display. This means people simultaneously looking at the same display (or light, or lighting effect) from different locations can see entirely different content. For example, someone looking at the display from the left might see a white light, while someone looking from the right might not see any light. Or, someone looking at the display from the left might see a blue light, or a rapidly blinking light, or an arrow pointing up, or a paragraph in Chinese characters, or an image of a cow, or a video of a bouncing ball, while a quest player from the right might see a red light, or a slowly blinking light, or an arrow pointing down, or a paragraph in Cyrillic characters, or an image of a chicken, or a video of a spinning top. In some embodiments, thousands of individuals or more might share the same display and each see something entirely different, though all are looking at it at the same time.

Multi-view display systems achieve this by simultaneously directing different versions of content (such as a light, effects, image, video, or so forth) to different viewing zones. Viewing zones are subsets of the total viewing area from which an MV display can be seen. So, all the places from which an MV display may be seen are its viewing area, and the specific places from which different versions of content may be seen are its viewing zones. Each different version of content is assigned (or matched) to one of these viewing zones.

An individual who continuously looks at an MV display while wandering through its various viewing zones would see a new version of content whenever crossing the boundary into a new viewing zone. Depending on the MV display system, the versions of content shown in each viewing zone can be customized—even to the point of continually reconfiguring the viewing zones, and continually reassigning the content. This means a viewing zone might be continually adjusted so it follows an individual walking past an MV display, allowing that individual to see customized content directed exclusively at them as they move relative to the MV display and cross the paths of other people looking at the same time at the same display. Meanwhile, these other people might be watching their own version of content that is customized for them.

A multi-view display might consist of a single MV pixel, or an array of MV pixels that are arranged in a traditional display format, or a collection of irregularly placed MV pixels that might follow the contours of a roofline, the curves of a road, or the branches of a tree, as examples.

MV display systems can enhance and enable quest games played by even a single participant, but they are especially valuable when larger numbers of participants are involved. The ability to scale these experiences to accommodate many participants is essential. The multi-view display quest systems and methods that support quest games according to the present invention may create more enjoyable, scalable, and valuable experiences that address the challenges and opportunities discussed above.

Increasingly, quest games are played in theme parks and other crowded environments where many participants are trying to simultaneously enjoy the same experience. With current techniques and technologies this can be problematic and even unachievable. The important benefits that venue-based entertainment companies hope to realize from quest games are beyond reach. Anyone trying to simultaneously engage large numbers of participants with a quest game using traditional technologies will be frustrated.

Take for example a quest game at a theme park, museum, zoo, retail complex, resort, cruise ship, or tourist district that requires players to search for a series of hidden sites. Once a participant has found one of the secret sites, they point a device (e.g., a magic wand) at some feature, image, or object to trigger a surprising effect or reveal a secret clue. In this example, participants will all-to-easily find each site because a crowd of players will already be there waving their wands. This aspect of the game will have been ruined; players will be following crowds instead of clues. In addition, no single participant will feel the satisfaction of triggering the effect or revealing the clue since there will be many players simultaneously doing the same thing. The sense of individual power and achievement will be lost—no one will know if they are the one doing it. Also, any surprise effect is not really surprising, and no secret clue will be secret, since they will be revealed continually due to the number of participants. Players will see the effects and clues as they approach them. The individualized, mysterious, challenging, questing aspects of the experience will have been entirely diluted. It will no longer be a game—it will be a herd activity.

In addition, logistical aspects of the game will be problematic. Assigning teams, selecting devices, handing out materials, and finding the starting point, will all be confusing, time-consuming chores instead of fun, magical activities that support the immersive theme of the game.

Providing a major pay-off for completing the game will be severely limited by the number of players. Assume that a triumphant player is awarded with the ability to wave their wand and transform a major feature of a theme park (e.g., a castle) with twinkling lights of the player's favorite color. With a large number of players, each would be forced to wait in a lengthy queue for their turn to make the transformation; the transformation itself would not seem special or surprising; and non-playing guests in the park would be forced to endure the continuous chain of transformations that might not be as pleasant or scenic as the castle's usual lighting.

As discussed above, digital and real-world game-play can be combined into a single overarching experience, with participants immersing themselves in online worlds for portions of the game, and then venturing into physical environments for other parts. For example, in the digital phase they might use their computer to solve a puzzle, or search a digital labyrinth, or collaborate with other players on social media. The clue they find during this digital phase of the Quest might direct them to a city or theme park or other venue for a subsequent real-world phase using the multi-view display quest systems and methods according to the present invention. Perhaps a scavenger hunt or other activity in the physical world then leads them to an internet link that continues the game online for yet another phase.

Attractions of a real-world quest experience, facilitated by the multi-view display quest systems and methods of the present invention include:

- Motivating participants to seek and read MV displays that have embedded marketing messages;
- Exposing participants to cultural, historical, natural, and other enriching places;
- Inspiring participants to visit places where they may see products or services they may wish to buy;
- Boosting the appeal of entertainment venues with a game that is differentiated from what can be experienced at home or on phone apps;
- Preventing participants from unsafely and unsociably walking around while looking at their phone or encased in a headset;
- Requiring participants to rent or buy a themed device (e.g., an ID device such as a wrist band or a magic wand); and
- Preventing third parties from hijacking the quest player's own quest experience.

MV display quest systems are a technical solution for improving important features of quest experiences beyond the problems of public venues and numerous participants. Many quest experiences are based on player immersion, well-hidden clues, magical devices, mysterious effects, and grand-scale payoffs that have been difficult to achieve with prior techniques and technologies. The following non-limiting examples include ways in which MV display quest systems may be applied to characteristics shared by many types of quest experiences.

MV Display Quest Examples

MV technology can be applied to numerous game mechanics to enhance, and even reinvent, the quest experience—both for small and large numbers of participants. Most importantly, it will allow large numbers of participants, all playing at the same time, to each enjoy an individualized experience. Below are ten (10) exemplary arear or fields A) through J) in which these benefits of various embodiments of the present invention may be achieved.

A) Player and Team Assignment

In cases where teams need to be assembled, or individuals given a specific quest, an MV display quest system or method can quickly and magically communicate these assignments.

For example, a group of participants could all look at the same MV display and each would see their specific team assignment in a message not visible to anyone else. Perhaps the message would also reveal to each player a secret identity or attribute. In this manner, small groups, as well as crowds of thousands, could be quickly organized into teams and given individualized information pertaining to their team and role.

This same technique could be used for giving each team and each player their objective in the game. MV displays may simultaneously give individualized instructions to thousands of quest players, compressing the process from an all-night event into a spontaneous revelation that only takes seconds. That's magic.

A Quest experience may begin with an individual player being assigned to a team, or role, or persona, for instance. This information may be presented on an MV display so different individuals, or different groups, simultaneously see their specific designation.

To achieve this, each version of information—such as a team assignment—would be matched to a distinct viewing zone. Individuals or groups occupying that zone would see their assignment when looking at the MV display. Assignments might be done on an arbitrary basis. For instance, zones and their associated content/information could be laid out in advance, and people who choose to stand in a given zone would find themselves assigned to a team randomly associated with that zone. A random selection generation technique might be used to ensure players cannot anticipate where they should stand to receive any given team assignment. Alternatively, there might be markers on the ground or elsewhere that influence where players choose to stand so their assignments are more meaningful. For instance, there might be a map or depictions of animals or environments, and by standing on a graphic that appeals to them players would receive an appropriate assignment. These markers might be somehow depicted on the ground, or on banners or other surfaces. Or they might be created by projectors or gobos that could themselves be controlled by an automated process or through an interface. There may be gameplay that influences where players stand and thereby receive their team assignment. Players might compete to select the spots they want, or they might need to solve a challenge. The MV display quest system may recognize individual players no matter where they are standing and make assignments based on a profile, sensor data, performance stats from prior gameplay, player characteristics, or other criteria.

Example A-1

Take the case of a company participating in a quest game team-building event. There are fifty people to be divided into ten Teams of five (Team Arachnid, Team Feline, and so forth) with everyone assuming one of five Team Roles (pathfinder, code-breaker, puzzle-solver, trivia-master, or spy); one of fifty Identities (Tarantula, Leopard, and so forth); and one of fifty Passwords (8Eye, 9Lives, and so forth). The fifty people might gather in front of an MV display and each see, simultaneously, their Team (e.g., Team Arachnid), Role (e.g., Spy), Identity (e.g., Tarantula); and Password (e.g., 8Eye). These individualized assignments will be revealed at the same moment to all fifty players. There will be no need to call out names, or find names on a roster, or have teams organize themselves. In some embodiments it may be desired to make assignments a secret, which can be achieved with an MV display since players can only see content intended for them.

To execute on this, the fifty participants are asked to spread out, staying within the sightline of an MV display. The MVD quest system—which includes sensors feeding data into a processor (controller)—identifies each participant as a distinct blob, and gives it a designation in the range of Blobs 1-50. Parameters for making assignments will have been inputted into the MVD quest system and are referenced by the controller. In this scenario, the parameters dictate that roles are not duplicated within the same team (so two people on the same team will not both be a Spy); blobs near each other are placed on separate teams (so players will be encouraged to meet new people); identities are associated with passwords and distributed as a matched pair, but roles are random in respect to identities and passwords (e.g., the player identified as Tarantula can easily remember their password is 8Eye, but the fact they will serve as a Spy for their team cannot be predicted by their name).

The four variables are combined into one version of content (e.g., Content Version 42=Team Arachnid, Spy, Tarantula, 8eye), and this version of content is assigned to a viewing zone (e.g., Viewing Zone 42). Blob 42 looking at the MV display from Viewing Zone 42 will only see Version of Content 42, and not any of the other 49 of 50 versions of content.

Using inputs from the MV quest system's sensors, a controller will have established 50 distinct, non-overlapping viewing zones, one around each blob. In this example, as the blobs move, the viewing zones are dynamic and move with them. The blobs cannot successfully seek or see other combination of variables. The system ensures Blob 42 always remains in Viewing Zone 42 and therefore only sees Version of Content 42.

The blobs are then instructed (by their respective versions of content projected by the MV display) to gather around the team banner that matches their assignment. For example, everyone on Team Arachnid will scurry to the banner showing a spider. Once at the banners, the blobs (players) will meet their team members.

The instruction to go to the team banner may be made on the same MV display that previously was showing fifty versions of content. But now, the MV display may only need to show one version of content and not fifty. To do this, it may replace the fifty viewing zones with one viewing zone. All fifty players are contained in this new viewing zone, so players all see the same version of content when looking at the MV display. Viewing Zone One, which encompasses all the players, shows Version of Content One, which consists of the message: "Go to your Team Banner."

Example A-2

In another case, players can have some influence over their assignments. They enter a space that has projections on the floor of various types of animals. Once a player occupies a spot on an animal for a certain amount of time, the animal disappears, and the spot cannot be taken by another player. Sensors determine the spot is occupied by a non-moving blob (a person) and the controller changes the media for the projector aimed at that spot—from an animal to nothing.

When the sensors inform the controller that all the blobs are stationary—meaning each player has selected an animal—the controller establishes a viewing zone around each blob. Each of these viewing zones has a version of content thematically based on the animal. So, when a player stands on the projection of the Tarantula, the image eventually disappears and the player sees on the MV display that he or she is assigned to Team=Arachnid, Role=Spy, Identity=Tarantula, Password=8Eye.

The controller then dictates that all players/blobs be encompassed in a single viewing zone that shows the version of content that says: "Go Find Your Team." Everyone in the viewing area of the MV display sees the same message. The controller sets the projectors to show graphic depictions representative of each team (e.g., spiders, felines, and so forth) and players organize around these graphics.

Example A-3

In yet another version, the players have predetermined assignments that have not been revealed to them. For example, the organizer of a company event may have made assignments so members of different departments learn to work together. In this scenario, each player might have a QR code sticker, RFID chip, or other identifier that can be recognized by the system sensors and relayed to the controller. The sensor may identify players by appearance, or cell phone signal, or other means. This allows the controller to create a viewing zone around each player that is specifically linked to that player's identity. For example, the sensors can provide the controller with Mary Jones' location, and the controller will establish a distinct viewing zone at that location. The version of content intended for Mary Jones, which will include her Team assignment, Role, Identity, and Password, will only be visible on the MV display from that viewing zone. Mary's colleagues, looking at the same MV display from their respective viewing zones, will only see their own versions of content.

B) Use of (Player) Devices

Many Quest games may require that players use a device. These devices might allow participants to identify themselves, decode or view clues, shoot a target, verify a location has been visited, acquire items or images, or trigger effects, as examples. The device might be themed in a variety of forms, including a wand, weapon, camera, phone, glasses, scientific instrument, black light, rubber stamp, writing utensil, stuffed animal, action figure, pin, lanyard, fob, ring, or bracelet.

Devices can be especially powerful when used in conjunction with a multi-view (MV) display quest system. Devices make it easier to identify individual players, determine their location relative to an MV display, and establish communication between players and the game, whereby actions taken with the device can be received and interpreted by the MV display system. In general, devices make it easier for a player to personally interact with the game, leveraging an MV display quest system's ability to support large numbers of players while enabling individualized experiences.

Devices may continuously provide a signal to the system, or the user may initiate or trigger contact between the device and system. The device or the system might awaken the other. Communication, such as synchronization, may originate from the device, from the system, or both. Communication techniques between the device and the system may include IR, RFID, Bluetooth, LED, QR codes, or Wi-Fi, as non-inclusive examples.

Quest experiences that incorporate an MV display quest system can benefit from a device worn or carried by a player that identifies the player, communicates the player's location, triggers effects, cues media, provides feedback to the player, assists as a signal or decoder or recorder or collector, or serves other functions. The game's premise or storyline might make the device central to the overall experience. It might give the player magical powers, for instance. Or it might capture ghosts, or subdue aliens, or blast at a target, or reveal invisible messages from the past, or establish the player's claim to a location. It might be critical in defining the fictional role of the player within the game's storyline. If the player is taking on the role of a wizard, the use of a wand as a game device reinforces this fantasy. That is, wielding the device may be critical to both the game's functionality and its theme, immersion, premise, or story.

In addition, the device may serve to increase revenue from players. For example, while some people may be reluctant to pay hefty ticket prices to play a quest game, these same people might willingly buy a cheaply made magic wand whose sole value is to "unlock a quest experience." People often value things over experiences. Counterintuitively, many people put a high value on things that enable or enhance an experience. Thus, a cheap wand may be worth much more than a printed ticket. Also, as discussed earlier, there are times when entertainment providers feel they cannot charge for an experience, but can charge for an object that provides an experience. This is especially the case with one-price admission offerings at theme parks and other entertainment venues that cannot sell additional tickets to visitors, but can sell them a wand, for example.

These devices might be purchased, rented, or loaned. In some embodiments, the device might be something the player already owns, such as a cell phone, laptop, pad, smart watch, or camera.

Devices may be inspired by many themes, such as a wand, which has an intuitive form factor that allows its functional use to coincide with it fanciful use. When a player points his or her wand at an object to magically trigger an effect or reaction, the wand can make the magic real. It may achieve this by sending a signal (e.g., infrared) to a sensor, that relays the data to a controller, which creates a viewing zone around the source of the signal, and matches the viewing zone with a customized version of content, and then instructs an MV display to show the version of content to the individual associated with the wand. The controller remembers the player who used their wand at that location, and what version of content was delivered to them, and customizes the rest of the experience accordingly.

There are numerous criteria that may influence the theming of the form factor. It may be desired to use forms that are obvious in how they should be used. For example, if the functional purpose of the device is to have the player point it at a sensor, form factors such as guns, telescopes, cameras, flashlights, black lights, binoculars, and wands may be selected. If the device has a passive RFID chip in it, and needs to be waved close to a sensor, the device might be themed as some sort of detector, Geiger counter, scanner, reader, scientific instrument, or Star Trek® Tricorder. Less intuitive forms that might be passed close to a sensor include charms, tokens, totems, amulets, talismans, rings, gems, stuffed animals, action figures, pass cards, fobs, and bracelets. In these examples, the sensor might have a graphic or impression that matches the theme or form of the device. The player will understand they should press their monkey charm into the monkey-shaped impression in a stone, or pass it over a monkey image painted in a wall mural.

In some embodiments, the device might have more than one apparent function. For example, a black light or a decoder for inspecting clues may also contain an RFID chip or QR code that communicates data when the player thinks it is serving some other function. Rubber stamps, writing utensils, note pads, and compasses are examples of items commonly used for Quest experiences that could do double-duty by incorporating technology that communicates with an MV display quest system.

If the device is meant to be visually detected, it might be a wearable item such as a pin, lanyard, hat, belt buckle, messenger bag, or wrist band. For all these forms, consideration must be taken about whether the device will be visible to sensors as it is normally worn and used. The player might be required to present or display the device in some highly visible manner at appropriate moments in the game. In a Spider-Man® theme game, the player may be required to point their wristband web-shooter in the direction of a sensor to make sure it is not hidden from view. Another story premise may require that a player make a first as if their ring could shoot power rays toward a sensor. Or the player may be instructed to wave their device as if casting a spell, or placing an enchantment, or presenting their credentials.

Other forms for a game device might include a phone, tablet, pad, glasses, compass, technical apparatus, staff, or divining rod.

Devices may continuously provide a signal to the system, or the user may initiate or trigger contact between the device and system. The device or the system might awaken the other, or synchronize with each other. Communication may originate from the device, the system sensor, or both. Among the many communication techniques between the device and the system are: RFID, IR, LED, Bluetooth, QR codes, Wi-Fi, live operator, and so forth.

While devices are often used in quest experiences, they are especially useful when partnered with an MV display quest system. There are many ways a device used by players can leverage the capabilities of an MV display quest system. Four broad categories are set forth below as non-exclusive example.

Example B-1

Devices can provide "identifiers" such as a code or signal that allow the MV display quest system to recognize each player as a distinct individual. This may mean a designation for the device itself (e.g., blue wand, or wand 4 of 10); or it may establish that the device is associated with an abstract person (e.g., wand owned by Player Blue who desires a level-three game experience); or the device may be linked to an identified individual (e.g., wand owned by Mary Jane of 99 Main St., Pasadena), as examples. By allowing the individual with the device to communicate some form of identity with the MV display quest system, the individual, via the device, can be tracked, and can receive differentiated feedback on an MV display. This differentiated feedback may be presented as a version of content directed toward the viewing zone occupied by the individual. The version of content on the MV display may be linked to the mechanics of the game itself—so the overall game experience and the MV display quest system are inseparable. The MV display quest system may follow the player's progress through the game to allow a sequential experience, track the player's accomplishments and score, and coordinate the experience with previous games. This information may determine what version of content is presented on an MV display to any given individual or team, and may also be essential to controlling the game experience.

Example B-2

Devices can also supply the MV system with a location for the player, which may be required in cases where the system must establish the location of the player relative to the display. The system uses this data to create a viewing zone around the physical location of the player. A version of content intended for that player may then be linked to the viewing zone. Players (and non-players) outside that viewing zone may see other versions of content, or no content at all. In cases where the viewing zones are fixed, the device might communicate to the system which viewing zone the player is occupying, and therefore which version of content the player can see. Or, a version of content appropriate for the player might be assigned to the fixed viewing zone occupied by the player, once that location is communicated to the system. In many cases, the viewing zone for a specific player will follow the player as the player moves—so they will always see a version of content intended for them.

Example B-3

By pointing their device at some object or other target, players may demonstrate their skill, or trigger an effect, or document they were at a certain location, or performed a required action. For example, their device might be in the form of a ray gun, wand, flashlight, light saber, or telescope that must be aimed at a target. The MV display quest system then determines, using sensors for example, if the player has pointed their device in the right direction. Or, players might be required to perform a specific gesture with their device— as if they are casting a spell for example. In this case, external sensors in the environment, or sensors or triggers within the device, might determine if the player has used the correct sequence of gestures or performed the correct actions and should be rewarded. The MV display quest system can enhance this process by providing feedback to the player on whether their efforts were successful, or what adjustment or correction might be needed. One example is a bullseye that consists of a single multi-view pixel. If a player hits the bullseye, it glows red—but only when looked at from the viewing zone occupied by the successful player. Other players, shooting at the same target at the same time, would only see the pixel glowing red if they had also successfully hit it. The bullseye would simultaneously appear red to players who hit it, and not appear red to players who missed. To assist players who missed, the bullseye might appear to flash at a rate that indicates how close they were to the mark. This feedback might simultaneously appear different to many players, giving each player individualized feedback on their performance.

Example B-4

The device might contain or store data. For example, it might possess audio recordings or other media that is played at certain moments of the game. Or it may keep track of what the player has done, or where the player has been—in the current game and maybe in prior games. In some cases, data might be stored with the system, while in other cases it might make sense that data is stored on the device. A case in point might be scavenger hunts played at zoos throughout the world. The zoos might not share the same networked system, but the device can store data to keep track of which animals the player has encountered at multiple zoos.

C) Matching a Player with a Device

In cases where quest games require that participants use a device, the assignment of the device to a specific individual can be an important aspect of the experience— functionally and thematically. An MV display quest system can inform everyone in a group or crowd which device they should select.

Using an MV display in this process, players can refer to the display to be instructed if they should select the red wand, or the monkey amulet, or the black light decoder, among all the devices available. As the game proceeds, these choices might give a player unique capabilities within their team, or provide feedback or effects customized to the specific theme of the device, or relate somehow to the preferences of the owner of each device. For instance, the red wand might trigger effects that are red, or reveal clues only given to those wielding a red wand, or exhibit special powers over red objects or symbols. The monkey amulet might only unlock clues where a monkey logo is present.

In a Harry Potter® quest game, this would be the equivalent of discovering which wand is best suited to each student. Or, it might be compared to myths and folk tales where each member of a group is given an object reflective of their personality that allows them to overcome specific hurdles and make unique contributions.

In games that require a device, it may serve the game's theme or storyline to have a fun, magical method for pairing the player with a device. From an operational standpoint, it might be desired—especially with a large numbers of participants—to have a systematic, organized method for quickly distributing devices. This becomes an even bigger factor if specific devices need to be assigned to specific persons, or the devices need to be programmed or otherwise customized for individual players. Another complication might be the need to distribute certain combinations of devices to each team, or to participants playing at any given time, or place, or session. A complex matrix of considerations might best be handled in an automated process, especially for simultaneously performing this task for numerous people or teams. Another benefit is to reduce the resistance of players who may want a different device than the one assigned to them. If the assignment is part of a magical process, without the apparent participation of a live person, players may be more reconciled to accepting the assignment and not causing a cascade of time-consuming device switching and choosing. In some games, there may be essential roles that no one is especially eager to accept.

These assignments could be made in a variety of ways. For example, players might assemble in an open area within the viewing area of an MV display. Sensors establish the location of all human-shape blobs in the viewing area and communicate this to a controller that is part of the MV display quest system. The MV display quest system creates a viewing zone around each blob, from which only one version of content may be seen on the MV display. All the assembled blobs/players are in the viewing area of the MV display, but from each viewing zone only one distinct version of content can be seen. The version of content assigned to each player's viewing zone will be instructions on which device to pick, or where that individual's device may be found, or some other information leading to a pairing of the player and a device.

Another example of device distribution is having players identified by the system through tags, or facial recognition, or some other method. When sensors identify the player, they are directed to their device by an MV display.

In creating the versions of content that pair a player with a device (e.g., "Pick up the Blue Wand," "Select the Wand in Box 3456," "Your Wand is Beneath the Sign of the Monkey"), the controller may rely on databases or algorithms to make a precise match. Or, the pairing might be arbitrary. Even in an arbitrary pairing, an algorithm might be used to take into account the proximity of guests to each other, perhaps to increase the odds that everyone in a group or family is assigned a different type of wand.

D) Distributing Game Materials

Similar to the assignment of game devices such as wands, MV displays may be used to distribute other materials required to play the game, including maps, instructions, checklists, coded documents, pamphlets, web sites, or memory media.

This part of the experience could be prohibitively tedious and time consuming, especially if there is a need to individualize the materials given to each team and player. The use of an MV display can make the process much faster, and help fold it within the theme of the game, rather than making it a bureaucratic pre-game chore.

The ideal for most of these types of games is to fully immerse players in the theme of the game, so every part of the experience reinforces the fantasy. If preliminary steps such as handing out instructions can be carried into the fun part of the experience, the game is that much stronger.

Some games may require the use of materials such as directions, maps, checklists, written clues, puzzles, decoders, pictures, comic books, web links, or media storage—as examples. It will often be desirable to make the distribution of game materials part of the immersive experience, and to reduce the logistical challenges of getting the right combination of materials to the right players. Both of these challenges can be addressed with MV display quest systems.

For instance, a game may require that every player receive the same map, while other materials—such as a list of clues—might be specific to each player, or to a specific player on each team, or to a specific team. A team might collectively possess a complete set of materials, but they might be spread out so each player possesses a piece of a larger puzzle. Or maybe each player in a game has separate materials, with all versions of materials spread among all players. In cases like these, where there is a need to precisely distribute materials, the MV display quest system can assess a range of variables—such as how many players are participating in a game and how players are divided into teams—and can then correctly distribute appropriate game materials to each player.

Example D-1

Distribution of materials using an MV display quest system can be illustrated by a simple scenario in which players are channeled through a game material pick-up area where there are various stacks of papers—sheets containing maps, clues, checklists, code words, and so forth. Each stack is numbered or lettered or colored or has some other form of designation. The stacks may be in themed containers or stashed in a hide-away. There are numerous players occupying the area at any one time, and they all look to a single MV display to receive directions on which stacks have the materials they need.

To deliver the directions, the MV display quest system identifies each player and creates a viewing zone around them. When the player occupying the zone looks at the display, they see a version of content consisting of instructions about which paper stacks to visit.

The system identifies a blob (a player) using sensors or some other technique, and references a database to match the blob/player with its (his or her) relevant details, perhaps its name or designation or team or role or some combination of these or other variables. The identity may be as simple as Blob #123, or as complex as the player's actual name, team, role, and so forth. The player's identity is then matched with the materials they need to pick-up for the game they are playing, and a version of content is created that communicates instructions on where to retrieve these materials. A viewing zone is created around the blob and the relevant version of content is assigned to that zone. Multiple players can look at the same MV display, and simultaneously see separate versions of content with no indication of what other players see. Player A might look at the MV display and see instructions to pick up game materials from the red, green, and blue piles; while player B, looking at the same time at the same MV display, will be directed to retrieve materials from the yellow, purple, and orange stacks. Players can then leave the distribution area with the exact materials they need for their game, team, and role.

Example D-2

In another example, ten teams of five players are assembled in an area served by three (3) MV displays. The 50 players need to collect their game materials, but not everyone gets the same items. Viewing zones are created that encompass respective players. These viewing zones are coordinated by the MV system so each of the three MV displays shows matching content to each player. Player A, looking at MV displays 1, 2, and 3, will see the same content on each display. This means each of the three displays will have 50 viewing zones, for a total of 150 viewing zones. Each player will occupy one of 50 viewing zones for each of the three MV displays.

To restate, an individual player will occupy one of the 50 viewing zones for Display #1, one of the 50 viewing zones for Display #2, and one of the 50 viewing zones for Display #3. The system will ensure that these three viewing zones will each show the same version of content to the same player. This content might direct the player to retrieve one map from Gary's Grocery, one checklist from Bill's Bookstore, and one decoder from Maud's Millinery. The 50 players looking at the same three MV displays will each see a distinct set of instructions intended just for him/her, and the instructions will be the same for each individual player regardless of whether they look at Display #1, #2, or #3.

In another implementation, the system might coordinate the versions of content so a player may need to read the distinct content on each of the three MV displays to receive a complete set of directions. In this example, each of the three destinations for retrieving a different game material might be on a separate MV display. Players who only follow the directions on two of the three displays will miss one of the items they need to retrieve.

Example D-3

There may be cases where a quest game requires the use of a smartphone or similar device. In these situations, players may be directed to different web sites depending on their team, role, identity, and so forth. By referencing an MV display, they can receive their individualized directions on which web site to access for directions, clues, or other information or media; or to input answers, puzzle solutions, photos, codes, or other information or data. Players may even be directed to call a certain phone number to retrieve or report information, in which case the number can be supplied on an MV display.

As in the earlier examples, directions to websites, phone numbers, and other non-physical information sources can be provided to players on an MV display in the same manner as guests are given directions to retrieving real-world, hard-object materials such as physical maps or check lists.

Yet another form of game material might be digital storage such as a thumb drive. Guests can be directed to acquire storage devices in the same manner as the other examples listed above. For instance, they may look at an MV display for directions on where to find the storage device intended specifically for them. The media storage device may contain clues, directions, references, back-story, puzzles, codes, visualizations, and so forth. Or they might serve to collect and store information relating to the game.

E) Directing Players to Begin their Experience

As explained above, the game theming should be introduced as early in the process as possible, and this includes directing players to the starting point. MV displays can simultaneously direct each individual in a large crowd to a wide variety of starting points. This is important with large numbers of players where it may be desired to spread them out quickly so they do not interfere with each other's experience.

Take for example a theme park or similar venue, where scores of players may want to start the game at the same time.

An MV display may simply reveal a color to each participant in a crowd, letting them know they should take the route or play the game associated with that color. Or, it may give explicit instructions on where they should go, and when. The MV display may show a countdown, that tells each player when they should begin the experience, so players are uniformly distributed—perhaps one player is instructed to begin the game every couple of minutes.

Some experiences might include a show or ride experience, such as a film or simulator. An MV display can instruct each player which door or line to enter, or which seat to take.

In this manner, crowds can be managed and distributed to make wait times shorter and the experience more enjoyable. Since the crowd management can be themed and magical, participants will feel less like herd animals.

An operational challenge in Quest experiences is how to pulse, launch, release, or initiate players into the game.

Some games may have a simple linear experience in which players go to a fixed starting point and then proceed on a set path. Perhaps the game starts at a theme park entrance and then proceeds clockwise through the park in an ordered fashion. In other cases, players may be released into an environment to seek clues or challenges or nodes in a more random fashion. For example, guests in a theme park might begin their game at any time and at any place, and proceed at will as if on an Easter egg hunt, maybe even playing the game surreptitiously while their companions ride the attractions. Yet other games may have multiple potential starting points and many branching paths. In these cases and more, the MV display quest system can inform players on an individual or team basis where their quest experience begins, and what time they can begin to play.

Managing these two variables—start location and start time—can be especially critical in crowded venues, and in situations where numerous players want to start at the same time. In some cases a game may begin after numerous players exit an orientation session, or a show, or ride, and releasing the entire cluster of players into the game would lead to an unpleasantly crowded experience. The MV display quest system can assess crowd size and composition, determine where and when individuals need to begin their experience to avoid overcrowding, manage the correct timing and flow of gameplay, and then simultaneously direct each player within a crowd where and when they and their team need to gather and begin the game.

This process might be referred to as managing the pulse of players into the game. The more players who are released into the game environment at the same time and the same place, the greater the risk of overcrowding and unpleasant conditions for players and non-players.

In addition to decreasing player frustration, the MV display quest system can also make the process blend with the game theming to create a more entertaining, immersive experience. Unlocking the information on an MV display about where and when to begin the experience can even be made into its own puzzle or challenge, so it does not come across as a form of instruction or bureaucracy.

Example E-1

An example is a quest experience in a theme park where teams race to find as many hidden graphic images as possible—perhaps a character mascot that has been integrated into design elements throughout the park. Teams may be competing against the clock and need to start at the same time.

Crowds, including players and non-players, enter the park and see MV displays in various locations. Meanwhile, sensors linked to the MV display quest system search the flow of incoming people for individuals who registered online to play the game and are wearing an identifying sticker (ID device) they printed at home, school, the office, or elsewhere. Other tracking techniques and technologies could be used as well—such as cell phone tracking. The player might be initially identified by the sticker or printout, and then subsequently tracked by different means. When a player is identified, a viewing zone is created that encompasses the area the player is occupying. This is done for each MV display within sight of each player. As a player moves, the viewing zones are continually adjusted to follow the player. Based on the player's identity, the MV display quest system determines where the player needs to go to begin their game, and what time they need to be at the location. A version of content is created that communicates this information—perhaps in a simple, straightforward fashion; or maybe in a fun graphical manner that ties to the theme of the game; or maybe in the form of a puzzle or riddle. This version of content is associated with the viewing zones that encompass the player. Whichever MV display the player looks at, the player will see instructions on where to go and what time to be there. Other people looking at the same displays, whether players or non-players, will see their own versions of content independent of what the first player is seeing. This means other players can receive information on their own start places and start times, while non-players may see content that has nothing to do with the game, or perhaps instructions on how to sign-up for the game, or perhaps they see nothing at all.

Example E-2

In another example, players begin the game by riding an attraction or seeing a show. MV displays inform them when they need to be at the ride or theater so there is no need to wait in a queue. Players who are furthest away might be provided a countdown for how long it will take them to get to the starting point. Afterward, MV displays might be used to distribute the surge of people ready to start the next phase of the game.

F) Managing Player Flow and Distribution

To reinforce a sense of individualized gameplay, and to reduce issues such as crowded conditions, game interruptions, wait times, and interference from other players, the MV display quest system can track players and monitor the overall game environment, and make adjustments to optimize player flow and distribution. If the MV display quest system detects too many people are occupying part of the game environment, it can use MV displays to reroute players to less crowded areas. Or, if a game requires that puzzles are solved in a certain sequence, the ordering can be changed in real time and the content on the displays can be changed to direct players to underutilized paths. The complexity or difficulty of individual challenges can even be adjusted to slow down or speed up gameplay depending on conditions.

The ability to redirect gameplay at any time can also address the distribution of non-players in the game area. In a theme park, for instance, the MV display quest system can detect which areas are crowded with non-players and distribute game players accordingly. Or, an operator can make the adjustments based on observations about the environment.

Game flow may be schedule-dependent, to allow for changing concentrations of people based on events and time of day. In a theme park setting, this may mean redirecting game play from an area where a parade is about to pass by, or a show is about to begin, or meals are about to be served. If weather becomes inclement, gameplay can be concentrated in covered areas.

The routing of gameplay may also serve strategic purposes, such as exposing players to areas they might not otherwise visit, or places where they might spend money once the game is over. A shopping mall may want to increase traffic in front of certain shops and restaurants, and may employ the MV display quest system to justify higher rents or marketing charges to tenants to which traffic may be directed. If player profiles are known, certain individuals or teams might have their gameplay concentrated in areas of special appeal to them.

MV display quest systems can use sensors and other techniques to track the whereabouts of players and ensure they are distributed throughout the game area in a manner that minimizes crowding, interruptions, wait times, and interference from other players and non-players. In situations where players are not actively tracked in the game space, they may be tracked through their engagement with game nodes—such as activities or challenges. If they have pointed their wand at a certain target, for example, but have not engaged the next target, the system can deduce the player's location.

In this regard, the MV display quest system may normalize the number of players at all points of the game experience so they do not bunch up. Alternatively, there may be times when the system will want to congregate players for group experiences, or to have as many players and teams reach the finish point at the same time as possible.

In addition to optimizing game flow, the MV display quest system may also be used to route players in a strategic fashion for marketing or other purposes. For instance, a team comprised largely of teens might be directed through areas with shops and restaurants catering to their age group. Maybe the teens are routed away from quieter, more adult areas.

As players engage in the quest, the MV display quest system might deduce through its sensors what players find of interest regarding nearby shops, products, restaurants, services, exhibits, or other variables. The quest may then be modified to these interests, so players are sent through areas that could hold special appeal, or challenges are modified to their specific tastes.

From an operational standpoint, if the system's sensors or settings determine certain areas are crowded, hazardous, exposed to inclement weather, or otherwise not well suited for gameplay, players may be routed to different areas.

There are many ways the system can manage the distribution of players. In some cases, the game routing may be changed. Players may be led in a more-or-less roundabout fashion to their next destination. Or, certain activities or challenges may be added, dropped, or modified. There may even be timers or gateways that dictate when players are allowed to begin the next phase of their game.

In some cases, the MV display quest system may need to only provide players with basic game information. For instance, players racing against the clock may need to be reminded how much time they have remaining, or how they are ranking against other players or teams, or their score, or how many tasks still need to be undertaken.

Example F-1

In one example, sensors throughout a gameplay venue identify the players and communicate their location to a controller. The controller checks such factors as game state, flow conditions, venue capacities, status of competing players, and so forth, and then creates a version of content for each player. The MV display quest system establishes a viewing zone around each player for each MV display in the viewing area of the player. From these viewing zones, each player can see on the MV displays the game information specific to their needs. Many players looking at the same time at the same MV display or displays will only see the version of content intended for them.

Example F-2

In another example, a family (or group or individual) visiting a theme park (or some other venue) participates in a program to meet as many of their collective objectives as possible. The family inputs into the MV display quest system a prioritized list of the shows and attractions they want to experience, the characters they want to meet, the parades and firework shows they would like to see, the collectible items they want to buy, the food they would like to eat, and so forth. They may indicate which family member is most interested in certain objectives to make sure everyone is happy and the system does not "unfairly" cater to a few family members, leaving someone (and therefore, everyone) unhappy. The information may be entered on a smartphone, online at home or in a hotel room, or through a written questionnaire, or at a kiosk at the theme park, or on a plane or in a car traveling to the park, and so forth. It may be presented as an entertaining game or activity—perhaps a virtual visit to the park.

The controller for the MV display quest system analyzes the family's input against attendance and usage projections for the day of their visit, perhaps giving the family real-time feedback on the likelihood of meeting their goals.

Once the family is at the park, they are given some means for identifying themselves to the MV display quest system. For example, they may be provided devices (ID devices) that allows them to be visually, or electronically, or mechanically, tracked. Perhaps they may submit pictures or visit a photo kiosk so their faces or other features will be recognized. Perhaps they submit a description of their clothing. A kiosk or other stations at the park may be used so the family can test whether they are being successfully tracked, and make any necessary adjustments.

Inside the park, sensors or other means are used to track the family's whereabouts. Using this data, the controller can estimate the distance to the family's various objectives. For instance, the controller can estimate how far they are from the attractions they most want to see. Sensors, park employee inputs, crowd inputs, park usage models, and other means can be used by the controller to estimate wait times, optimal routes, and additional factors that might impact the family's ability to get to their desired destinations in an efficient manner. If enough families are signed up for an MV display quest system experience, the system will be able to proactively manage optimal visitor distribution patterns on a macro basis.

Throughout the park, MV displays provide the family with customized information based on the controller's analysis, so the family can continually make informed choices. The information may be presented in a straightforward fashion, letting them know their best choices at any given moment. Or, it may provide entertaining "nudges" to urge them on routes most likely to lead to satisfying outcomes. As the system tracks the family, it updates their information to give them a balanced experience based not only on what they want to do, but on what they have already experienced. At such locations as restaurants, a large MV display shared by many tables may give the family an opportunity to review their day thus far, and make desired changes to their priority list. Each table—and even each individual at each table—may simultaneously see on the MV display differentiated content customized just for them. Among the types of content might be a scoring system that lets the family know which members have met the most objectives, and which ones need to be prioritized so they can catch-up. In this manner, the MV display quest system can give everyone a voice, and impart a sense of fairness. The family will be motivated to meet its collective objective, instead of pursuing an every-man-for-himself approach. If dad has been getting to choose the rides he likes, meeting little Susie's objectives will be worth more points going forward.

When sensors or other techniques determine a family is near an MV display, the display will establish viewing zones around designated family members. The controller will create or select a version of content that may be seen by a person occupying each viewing zone. The information may be instructions, or perhaps a clue or nudge of some sort. In some cases it may be text, or it might be graphics, or flashing lights, or effects, or some form of media. Perhaps a cartoon character of the family's choosing is leading the family along. Maybe the content consists of a trail of twinkling lights. Different versions of content may be given to different family members. When the family signs up for the MV display quest system and service, an adult may request informative text for themselves, while choosing more entertaining content for the kids. Choices may be altered during the experience depending on family dynamics or other criteria.

As in previous examples, the same MV displays in the system can simultaneously be viewed by many people, with each person receiving content specifically for their needs. An entire family can simultaneous look at the same MV display, and each may see their own content. Other families will simultaneously see content suited to their differing needs. Park employees may look at the same MV display and see a summary of what everyone else is seeing. The system is so valuable because it can simultaneously serve the individualized needs of the many people making up a large crowd at a busy day in a theme park or other venue.

In this example, the "scoring" for the experience will be the family's satisfaction in meeting as many of its goals as possible, balancing the needs of all family members, and minimizing unpleasant crowds and waits. It may even be that families prioritize the things they most dislike, as well as the things they like, in planning their day. The park may choose to provide a payoff of some sort to families depending on what kind of scoring is used—for example, visiting less popular attractions might earn more points. On a macro level, the MV display quest system can more effectively distribute crowds and achieve other institutional objectives such as increased profitability, expanded capacity, improved visitor satisfaction, enhanced safety, and so forth.

Example F-3

In some embodiments, it may be desired to enable the MV display quest system to teach itself to optimize for various criteria. In a theme park example, the system may want to incrementally change a given set of parameters and analyze the outcomes to improve player satisfaction, game throughput, park throughput, business at shops and restaurants, utilization of low demand assets, and so forth.

To this end, the operator may establish which criteria are to be changed by the system. Maybe the sequence of nodes is continually rearranged, or capacity levels adjusted, or certain nodes dropped or introduced, or versions of content modified, or viewing zones tweaked. The range of possible changes to each criteria and to the set of criteria would be determined so the system would not attempt combinations or levels known to be undesirable. For instance, team size would never be attempted below or above certain levels already established as being unacceptable. The desired optimizations and tradeoffs—the system goals—would also be set.

The MV display quest system sensors and other means would be used to gather the data necessary for the system to measure performance, and analyze it against the adjustments made for that particular permeation.

The system would then cycle through the permeations, making adjustments until the optimizations are achieved. This may be done automatically by the MV system controller. Or, data or analysis may be provided by the controller to the operator so the evaluation process may be manually refined or the settings finalized.

G) Providing Puzzles, Clues, and Navigation

An important game mechanism is how puzzles, clues, and directions are revealed to players. For example, a player might arrive at a secret location, or perform a task, or solve a riddle, as a requirement to having their next location, challenge, or puzzle revealed to them. MV displays allow these puzzles, clues, or directions to be revealed to only specific individuals in a crowd so the rest of the crowd cannot see them.

For example, a player at Disney Land Park might be challenged to find a certain spot on Hollywood Blvd from which they will be able to view a secret clue. Perhaps they need to stand on the Walt Disney star at exactly noon. From that spot and at that time a code is revealed on an MV display located within viewing range—perhaps in a nearby retail window. This code is then used to determine the next location the player must find. Players not standing on the star would not be able to view the code. And players standing on the star seconds earlier or later would not be able to see the code. They might need to seek other places at other times to retrieve the code.

MV displays can show many types of content, which means puzzles, clues, and navigation can take many forms. For example, players looking at an MV display while approaching a secret location might see a light that flashes faster, or brighter, or changes color, as the player gets closer to their objective. The MV display could be incorporated into a prop such as a jewel, or lantern, or streetlight, and variations in the light emanating from these sources could guide the player to the location through a form of trial and error. Perhaps the MV display is themed as a painting portrait, and the subject's smile grows broader as the player gets closer to the secret site, but turns into a frown as the player gets further away. More obvious graphics could include appearing and disappearing navigational arrows, for instance.

In some embodiments, several MV displays may simultaneously be within view of a player, and the displays can call attention to each other to navigate a player through an environment. For instance, a series of windows and streetlights might all appear to glow with a blue light, revealing the route a certain player should take. Or, an MV display may instruct a player to travel to another MV display that can be seen flashing in the distance.

Many quest games will consist of a sequence of puzzles, challenges, events, destinations, experiences, tasks, hidden items, or other nodes that must be found or solved or undertaken. An important mechanism is how to propel or guide players through the sequence—giving them the information they need to complete one node and then find the next.

In some cases, an MV display quest system may navigate players through the game environment so they can reach a game node—such as a puzzle that needs to be solved, or a secret location that needs to be documented. In other cases, an MV display might provide a puzzle or challenge—serving as a sort of gateway, such as a riddle that needs to be solved before the player can proceed to the next location. It might reveal something that can be checked off a list, or used to solve a larger puzzle, or pointed at with a wand or other device or a gesture.

By using MV displays, players can receive game information on an individual basis, so other players and non-players will not see the same information. In some cases, the information will not only be shown to just one individual, but will contain individualized information. Perhaps this player-specific information will take into account the game state of the player (e.g., where they are in the game, what they have achieved, what their team has accomplished), or the identity of the player (e.g., their team, role, level, interests, game selection, past game experiences, advertising profile), or the state of the game (e.g., number of players, crowded conditions, time remaining on the clock).

Example G-1

Take a game in which players must observe, from specific locations, the color of light shining from lamps, which are one type of MV displays. Perhaps the lamps are in a historic area, and are themed to match local architecture. Or maybe they are in a theme park, and blend with local attractions. Perhaps they are lights on a Cruise Ship. Depending on the color of each lamp when observed from the right spot, the player is directed how to proceed on the next leg of the quest. If the player looks at a ship's lantern while standing next to a specific crate, they will observe the lantern is emitting a green light. By referencing their game map, which shows routes designated by different colors, the player knows they should take the green route to their next destination. (Green light=green route.) Or maybe the lantern blinks in a certain combination, such as three blinks, pause, three blinks. This might mean the player should take route 3 on the map. Or maybe players have a game compass and know three equates to the direction West. (Three blinks=go West.) Or, the blinking might be in Morse code, or have some other significance.

The route itself may be defined by a sequence of green or blinking lanterns. Players would follow these, rather than the red lanterns, or the lanterns blinking in sequences of two. Perhaps the lights change colors in certain sequences—red, blue, red, green, green—that each have meaning.

Other players, and non-players who are not standing at the right spot, will not see the colored or blinking light necessary to proceed with the game. Perhaps lanterns will just appear to emit a flickering white light, or no light at all, or will give the wrong information for finding the correct route.

To achieve this, the lantern lights will have multi-view capabilities. The MV display quest system sensors will detect and identify people in proximity to the lanterns, and will establish viewing zones around each player who is eligible to receive a differentiated version of content. The system will track the movement of people so viewing zones can be continually updated. The various versions of content will consist of the appearance of light in the lanterns. For example, one version of content may be a flickering white light, another could be a green light, another might be a light that blinks three times, and yet another would be no light at all. The MV display quest system can determine that different players need to follow different routes to successfully play the game, so ten different players looking simultaneously at the same lantern (i.e., the same MV display) might each see a different color that sends each of them down their own, differentiated, path.

Example G-2

In a variation of the above example, a player might determine from the color or rate of blinking from lanterns (MV displays) how close the player is to reaching a goal. A player might be moving about in a game area and notice the surrounding lanterns blink at different rates depending on the player's location. By moving in directions that increase the rate of blinking, the player will find they are getting closer to their objective. Through this manner of prompting, the player might find themselves in just the right spot to discover a game clue. Perhaps this clue will be in the form of another MV display that only reveals its content to players looking from the precise point attained with the help of the blinking lanterns.

In this example, it may not be necessary to identify or track the player. The MV system may just establish a series of viewing zones radiating, with increasing distance, from the goal (target, objective) in which each version of content consists of a light blinking at a certain rate. The viewing zones closer to the goal show versions of content consisting of a faster blinking light. In cases where different players need to find a location specific to them, the MV display quest system could track their location and set viewing zones and versions of content that lead them to their own goal.

Example G-3

Take the case of a quest game on a cruise ship where the premise has players pursuing clues to solve a larger mystery. As players seek and find different locations/nodes, MV displays at these nodes might ask questions or pose riddles or puzzles. When a challenge has been successfully completed, MV displays prompt the player to the next location.

In one location, an enchanted mirror (actually an MV display incorporated into a two-way mirror) might portray an object to the player. The player must then search the ship for that object.

In another spot, a ship's compass (with an MV display replacing the glass face), directs the player in a certain direction for the next clue.

In a hallway, an enchanted painting (an MV display in an elaborate picture frame) depicts a statue that can be found elsewhere on the ship, or a public room located on the ship, or a portrait of an older man depicted elsewhere on the ship in a portrait of a young man. These would serve as clues to the next location they must be attained.

A ship's lamp (with an embedded MV light) flashes a clue in Morse Code.

A digital clock (that incorporates multiple MV lights) informs player what time they need to be at a certain location.

Example G-4

A quest in an athletic gym may involve participants (quest players) to visit a sequence of stations to complete a daily work-out challenge. The MVD quest system would select for each individual a series of fitness stations/programs that provide a good overall workout, while referencing a participant's earlier challenges to design for long-term goals, for example. Use of the MVD quest system would also help the gym manage flow and capacity. MV displays would give individualized directions, tips, comparisons with earlier sessions, payoffs, encouragement, and generally propel the participating player through their workout sequence. This is an example of how an MVD quest system could be implemented for larger goals than just winning a game.

H) Acknowledging Completion of a Challenge

There are many ways MV displays can provide individualized feedback to inform players they have completed a challenge within the quest game.

One example is where multiple players pass through an environment in which they shoot or point at targets, perhaps with a wand, ray gun, or flashlight. Using conventional technology, a red light might glow on the target each time it is hit, as in Disney's Buzz Lightyear attraction. A problem arises when multiple players are aiming at the same target. How can any one player know they're the one who hit the target? Using MV displays, only shooters who hit the target will see a red light. Others, firing at the same time at the same target, but missing the target, will not see the light.

With MV display technology, differentiated feedback can simultaneously be directed to numerous players, all from the same MV display. Affirming content can be shown only to players who were successful, another form of feedback can be shown at the same time to players who were unsuccessful, and yet another message can be sent to players who had near misses—perhaps giving feedback on how to improve their aim. For instance, if a player hits a target it might appear red, while a second player who barely misses might see a flashing yellow, and numerous other players who missed the target altogether might not see anything—even though all the players are shooting at the same target at the same time.

Many activities, tasks, and challenges in a quest game will be more entertaining and easier to implement if they provide individualized feedback to players. MV displays provide the ability to do this even with a great number of players at the same location.

MV systems allow each player to receive individualized feedback in the form of a light or other visual media. For instance, they might shoot a ray gun at a target and see at the spot they fired a red light, or a multi-color light burst, or a radiating star, or a smoldering hole. Or, they might point a wand at a magic mirror and see the reflection of a frog transform into a prince or princess, or a ghostly face change expression or morph into a skull.

Individualized feedback also permits players to refine or adjust their aim. So, the face in the magic mirror might look in the direction the player pointed their wand and portray dismissive or alarmed expressions depending on how close the wand blast is to hitting it. Or, a light might blink faster the closer the ray gun burst.

Example H-1

As an illustration, players move about in a themed environment in which they seek to neutralize ghosts with a plasma ray or magic wand. The players must accurately point their device at the target to be successful. The ghosts might "materialize" in MV displays that are encased in old picture or mirror frames so they blend into their surroundings, appearing as paintings, photographs, or reflections. When a player successfully hits a ghost, it might react or disappear. Perhaps there is a lighting effect on the MV display, or on neighboring displays. If the player misses, the ghost might react with scorn, or hint with a glance at where the shot actually struck.

In the ghost hunt example, the ghosts might also manifest themselves in other forms that can be expressed with MV lights. For instance, spots or orbs of light, or reflections such as Pepper's ghost effects.

In these cases, multiple players can each simultaneously interact with the same MV display or displays, and each have a differentiated experience that is based on their individual accuracy, timing, powers, game state, and other factors.

A player that has not earned enough points to sufficiently power up their wand might be less successful than a player that has conquered numerous ghosts. Or, a player with the role of apprentice might not be able to take on the most potent spirits that can only be conquered by a master.

To achieve this, the MV display quest system will use sensors or readers or other means to create a viewing zone for each player. If there are multiple MV displays within the sightlines of a player, each display will have a viewing zone assigned to the player. The MV display quest system then identifies each player using sensors or readers or other means. The system checks on the player's status or state within the game, the player's role, and other pertinent data. This information affects the version of content made visible to the player's viewing zone. Sensors or other techniques inform the MV display quest system what the player has achieved in the way of hitting or missing the target within the game's framework: did the player hit a bad or friendly ghost; was the ghost hit within the allotted time frame and in the correct sequence; and so forth. This information further contributes to the version of content seen by the player. Of numerous versions of content available or created to be shown to a display's multiple viewing zones, each player will see the version of content that relates specifically to them, regarding the target the guest just shot, as well as all the player's background information regarding the game to that point, and the player's profile, such as their game role and team, their skill level, and other pertinent information.

The version of content shown to a player will communicate whether they hit the target (or completed the task or challenge) and may also give hints on close misses and so forth. The version of content may be as simple as a light going on or off or blinking; or it may be in the form of a score, such as how many points were earned with the hit, or the player's current ranking, or how many more hits are required to complete the game; or it may be an effect or media. Other players and non-players in different viewing zones for each MV display would see other versions of content.

I) Rewarding an Achievement with an Effect

MV displays can generate a variety of visual lighting effects that can be directed to specific individuals, rather than to everyone in viewing range. In addition, they can simultaneously display different effects to different people. In a quest game, these sorts of effects can be used as payoffs for finding a location, solving a puzzle, or collecting an item, as examples.

A player in a shopping mall might point their wand at one of the gems in the display window of a jewelry store, and cause the gem to twinkle. The player might then proceed to the display window of a toy store and trigger the eyes of a teddy bear to light up. Further in the quest, the player might point at a TV in the window of an electronics store and see a photo taken of them at an earlier point in the quest. Other players might simultaneously see other effects, entirely different from what the first player sees. Visitors or shoppers not playing the quest would not see anything at all. The MV displays allow each player the satisfaction of knowing they triggered the effect; and, the effect they see is different from what anyone else can see; and, the effect itself is a surprise they were required to reveal because it was not visible to them when other players were activating it.

Many players can participate at the same time, have a differentiated experience, and not interfere with each other.

MV displays are capable of a wide range of visual effects, including lights that shine, shimmer, blink, pulse, fade, and transform in numerous rates and patterns. The displays can also show still and moving media, including letters, numbers, shapes, graphics, images, video, and so forth. Used in combination, MV displays can outline the shape of a building, structure, landscaping, or other features. Or they can provide coordinated effects or media spread out on many displays.

In a quest experience, these capabilities can serve to reward or acknowledge a player or team that has completed a task, solved a puzzle, reached a destination, found a hidden object, revealed a clue, and so forth. Conversely, MV effects might also be used to mock, spur, nudge, encourage, correct, or otherwise react to players who are not successful.

These forms of feedback have an operational role in letting players know they have completed a node of the quest, or in helping them complete the node. They are also important in providing an entertainment aspect to the quest. The feedback provided by an MV display might be designed to be funny, surprising, impressive, mysterious, or otherwise entertaining, enriching, or empowering.

Example I-1

As an illustration, a quest game in a shopping mall requires players to interact with the displays in retail windows. Perhaps the player must point a device at certain props in certain windows to trigger entertaining effects and thereby progress through the game. In a jewelry store, the player might know they were successful when a multi-view light makes a giant jewel appear to twinkle a certain color that only the player can see. The player may be required to make note of the color, or use the color as a clue to get to the next location, or maybe it is only an acknowledgement so the player knows they have accomplished the task. Perhaps the color indicates how much time is left in the game, or reveals the player's status in the game. If the player knows their designated color is blue, any blue light—such as a strobing blue gem—will be an acknowledgement intended specifically for them. A red light or rapidly blinking light might warn them they are running out of time, or are in last place, or missed pointing their device at the right target.

At a clothing store window, embedded multi-view lights in the eyes of a mannequin might light up only for the player. In an art supply store, multi-view lights might be embedded in a giant painter's palette that reveals certain color patterns for each player. A multi-view monitor themed as a toy in a toy store window might spell out the player's name, or instruct them where to go next. MV lights and displays might be embedded in all sorts of props, and merchandise, and backdrops, and arrangements, throughout the mall. Not only could they fulfill a role in game mechanics, but they would surprise and entertain the player.

Each player would see effects intended only for them, while other players would simultaneously see other effects, different from what the first player sees. Shoppers not playing the game would not see anything at all; the game would not disrupt their browsing. The MV displays allow each player the satisfaction of knowing they were the one who triggered the effect, the effect they see is different from what anyone else can see, and the effect is a fun, satisfying surprise. Many players can participate at the same time, have a differentiated experience, and not interfere with each other or with non-players.

The effects for each game node would consist of a differentiated version of content for one or more MV lights or displays. The versions of content might be a light of a certain color, brightness, or rate of blinking; or a message; or a form of media, as examples. The version of content might be combined with versions of content spread out among several multi-view lights or displays that might be coordinated with each other. Each multi-view light or display would have a number of different viewing zones. A different version of content would be seen by anyone occupying each viewing zone. In the example above, a player might point their device in the direction of a sensor, the data received by the sensor would be directed to a controller, the appropriate version of content would be selected or created for the player, and a viewing zone would be created around the player. The version of content intended for the player would be assigned to the viewing zone they occupy. The version of content might be based on such factors as player identity, game status, player behaviors, and so forth. If there are a number of MV lights and displays intended to be seen at the same time by a player, this process would be repeated and coordinated. Different players would each occupy their own viewing zones, from which they would each see a version of content on the MV display or displays intended specifically for them.

J) Providing the Big Payoff

In a physical venue, it may be appropriate that the payoff of a quest leverages the environment in which the game has been played. This payoff can be made possible on a grand scale by applying MV technology. For instance, a big payoff in a physical environment might consist of the player receiving power over the lighting, effects, and colors of their surroundings, including monumental buildings or other large-scale features. This is in contrast with handheld and home games in which players only affect the small-scale digital world portrayed on their screen.

In a theme park setting, a victorious game player might receive the power to transform the color of a castle. In other venues, a giant marquee or scoreboard might flash the name of the winner. In crowded settings, these events would be inappropriate and impractical using conventional methods, because there would be too many players waiting to exhibit their newfound power, and it would be annoying to those not playing the game. With MV display technology, only the winner would see their specific color effect (achieved through MV lighting), or message on the marquee. Many other winners would simultaneously see their own custom effect or message, and non-winners would see only the standard lighting and messaging that would typically be shown—mystified by whatever seemed to be enthralling the quest players.

For instance, a player using a red wand might complete their quest in a theme park setting. As a reward, they possess the power to point their wand at the castle in the center of the park and cover it with rapidly twinkling red lights. At the same time, a victorious player with a blue wand points it at the castle and sees slowly strobing blue lights. Hundreds of players each see their own effect, while non-players view the castle covered with traditional white lights and wish they could see what is making the game champions so happy.

MV display quest systems can create individualized large-scale effects that are ideal as payoffs for completing or winning a quest experience. This allows a quest experience to fully leverage a real-world environment at a magnitude not possible for at-home and online games. It also permits a payoff that feels more satisfying and empowering and real than anything available on a screen or in an AR (alternate reality) or VR (virtual reality) headset.

For example, imagine a quest experience in Paris that allows winners to transform the lights on the Eiffel tower to their favorite colors or effects. Or a quest in a theme park that grants victors the power to dramatically change the lighting on a castle, or a roller coaster, Ferris wheel, giant sphere, or some other structure or icon. Players might be empowered to light up a towering Christmas Tree, or a city arch, observation tower, bridge, skyscraper, monument, gateway, or waterfront. The player's or team's name may flash on a billboard, marque, or scoreboard; or on every display and in every shop window they pass in a mall or on a city street.

By using MV displays as pixels, these effects can be implemented so only a select number of people, or a select area, can see them. This means multiple victors can simultaneously receive their epic reward, without impacting each other or other players and non-players.

In a theme park, for example, there might be a hundred individuals who have completed a challenge and been given the power to transform the lighting on a castle. But if everyone can see the lighting transformation, only one player can demonstrate their power at any one time. Soon there will be a prohibitively long line of players waiting to demonstrate their power. In the meantime, other guests in the park are forced to endure the continuous changes in lighting imposed by game players, instead of being able to enjoy the optimal lighting selected by the park designers.

Example J-1

As an example, several thousand players simultaneously engage in a quest game at a large theme park with many visitors. An MV display quest system uses sensors to track each player. When the system determines a player has found a certain number of locations—say ten—or completed ten challenges, solved ten puzzles, ridden ten attractions, met ten costume characters, purchased ten collectable pins, or met ten other objectives, the MV display quest system provides the player with the capability to transform the lights on a castle to their personal selection of color or colors, and to flash the lights at rates and sequences of the player's choosing, and to create other visual effects. Perhaps there is a window in the castle (actually an MV display) and the player is able to make the character of their choice appear in the window. Perhaps an image of the player appears in the window. Maybe an MV marque on the castle displays the player's name. Customized effects, colors, images, names, or words, might be reflected on the surface of the moat or on other water features around the castle.

The player may stand at any of numerous locations to make the transformation. The player might use an interface on their phone or another mobile device to design the castle lighting to their preferences. Or maybe the lighting is based on the color of the player's wand, or some other characterization of the player, or the player's team, role, designation, device, or pre-stated preferences. Maybe the player makes changes through gestures or other means.

To trigger the light transformation, perhaps the player enters a code or points a device or gestures or interacts with some object. There may be numerous gargoyles surrounding the castle and the player may need to hold an identifying device next to any of the gargoyles, or next to a specific gargoyle. Maybe the guest points a wand in a specific direction, or taps the wand on something.

The MV display quest system determines the player's location—perhaps through sensors, or perhaps the player has been directed to a certain spot, or through some other means. The MV display quest system then creates a viewing zone that encompasses the player. Perhaps the viewing zone is a bit larger, so it also encompasses the player's companions or team. This viewing zone will be coordinated for every MV display or MV pixel intended to be part of the overall experience, so each MV display and pixel will show a special version of content to the viewing zone occupied by the player. If there are one thousand MV pixels on the castle within view of the player, and the player wants to cover the castle with red lights, the viewing zone occupied by the player for each of the thousand displays will be shown a version of content that consists of a red light.

The castle window that consists of an MV display will also show a specific version of content to the player's viewing zone. Maybe the player has requested an appearance by a certain princess, and so a version of content consisting of media of the princess waving her hand will be shown to the player's viewing zone. The same with a marque.

In the case of effects that are reflected off water, a secondary calibration will be made so the content on the MV displays intended for a specific player will be directed to the viewing zones on the water most likely to reflect in the player's direction.

Since other players and non-playing guests will be outside the viewing zone occupied by the player and the player's companions, they will see other versions of content, or perhaps no content at all. They will be seeing content specific to the viewing zones they occupy. This means multiple players can each be rewarded with different versions of content. Numerous other players occupying different places within sight of the MV pixels and displays on the castle can simultaneously trigger their own custom or distinct lighting effects and images. Meanwhile, non-playing guests can enjoy the castle with its usual lighting.

Example J-2

Another example is a quest game in a museum complex that challenges players to engage with a variety of exhibits and learning activities. If victorious, players are given the power to write their name in the stars of the museum planetarium.

In this case, the stars are each an MV pixel (or multiple stars might be collectively shown on a larger MV display). When the MV display quest system determines a player has completed the quest, the player is able to trigger a star effect in the planetarium. For instance, a series of stars might appear brighter so they form a constellation that spells the player's name. In this case, multiple players could look at the same star field and each sees only their own name. Non-players looking at the same time at the same star field would see an ordinary night sky.

To achieve this, individuals would be identified by the MV system and a viewing zone would be created around them. This would be done on behalf of each of the relevant MV pixels or MV displays. Perhaps there are a thousand MV pixels that each constitutes a star, and a viewing zone is created for each "star/pixel." In each of these viewing zones, a version of content is shown that relates to the specific player. For players being shown their name, a specific MV pixel might show a version of content that is a bright star. For other people occupying other viewing zones, the MV pixel might appear dim.

Example J-3

An additional example is a theme park where players compete to receive a personalized acknowledgement on a parade float. There may be tens of thousands of people watching the parade, but only players who have completed their quest will see customized messages on a parade float when it passes their viewing spot. To do this, the MV display quest system identifies players on the parade route who successfully completed the quest. MV displays or MV pixels on the float show a version of content to the viewing zone created around each victorious player. The versions of content might spell out the player's name or provide other differentiated messaging or effects.

Example J-4

At a ballpark, players who complete a quest might see their name on the scoreboard. Thousands of winners simultaneously looking at the scoreboard could each see only their name or differentiated message or effect. In this case, viewing zones might be created for each seat in the stadium, so individualized versions of content can be sent to each seat's viewing zone. Participants might enter their seat number into an interface on their phone, or might be identified by sensors or some other means.

Example J-5

Participants who complete a quest at a shopping mall might see their names and congratulatory messaging in MV displays in shop and restaurant windows. Perhaps the displays are in frames to appear like paintings or magic mirrors. MV display pixels may be embedded in props in the windows such as jewels in a jewelry store that only sparkle for quest winners. They might be incorporated in seasonal decorations such as Christmas Trees, that light or blink when quest winners are in proximity. In all these cases, quest winners are identified, they are encompassed within their own viewing zone, in which they receive their own differentiated version of content which only they can see. Other quest winners looking at the same time see their own version of content, and non-winners see yet another version of content.

Definitions

As used herein, the term "display" may describe: a single display, multiple displays, an array of displays, arrangements of displays, or a single projection source (pixel). Displays might also take the form of scattered pixels, such as might be used for architectural lighting, or laid out in strips, or patterns, or as star fields, or arbitrarily, or in dynamic, moveable arrays—without limitation. In this disclosure, the term display is used interchangeably with such terms as sign, signage, signal, and light, and may also refer to the use of multiple displays in the various configurations described above.

The term "content" describes what is seen (or not seen) on the display. The phrase "version of content" describes anything that differentiates one type of content from another. In one version of content, a single white light might appear to be a certain level of brightness, while in another version of content the light might appears brighter or dimmer. If an individual looks at the display and sees nothing, the absence of any illuminated pixels can be described as a version of content. Other versions of content may consist of a single light, colored or uncolored light, a blinking or steady light, a light that fades or intensifies, a light that transitions between colors and states, or a symbol, graphic, effect, animation, text, or complex media. Versions of content may vary by such characteristics as flashing in different sequences or patterns; or changing in brightness in different sequences or patterns; or alternating between different colors in different sequences or patterns or combinations.

The phrase "viewing area" describes the total area from which an MV display may be seen. If an individual is able to see the display, they are in its viewing area. The viewing area may include locations at angles or distances from which content on the display may only be seen with difficulty, as well as locations from which content on the display may be partially blocked.

The phrase "viewing zone" is used to describe a non-overlapping subset within the viewing area; a subset from which one distinct version of content may be seen. A viewing zone is a smaller portion of the total region in sight of the display. The viewing area for the display will typically be divided into multiple viewing zones, none of them overlapping, and each assigned a different version of content. In simple cases, a viewing zone might be created within the viewing area, and only individuals within that specific zone can see content when looking at the display. The region outside this zone will constitute a second viewing zone, from which the version of content seen on the display will be no content—the display will appear to be blank, or turned off. In some cases, a viewing zone may include all the locations from which a display may be seen, in which case it coincides with the viewing area. Typically, any individual looking at the display from a specific viewing zone will see the content that has been assigned to that zone, and will not be able to see the content being simultaneously shown to other viewing zones.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-view display (MVD) quest system comprising:
a first multi-view (MV) display including one or more MV pixels, wherein each one of the one or more MV pixels is configured to emit multiple beamlets in different directions in a beamlet coordinate system;
an input node which, in operation, receives a first attribute of a first quest player or of a first viewing zone;
a system controller, coupled to the first MV display and the input node, which, in operation:
   defines the first viewing zone located relative to the first MV display in a viewing zone coordinate system;
   determines a mapping that translates between the viewing zone coordinate system and the beamlet coordinate system;
   associates a first quest related content with the first viewing zone based at least on the first attribute;
   for a first image generated from the first quest related content, using the mapping, identifies a first bundle of beamlets from the one or more MV pixels of the first MV display directed to the first viewing zone to form the first image; and
   outputs first control signaling for the one or more MV pixels, the first control signaling defining color and brightness of each of the beamlets in the first bundle to project the first image to the first viewing zone.

2. The MVD quest system of claim 1, wherein
the input node, in operation, receives a second attribute of a second quest player or of a second viewing zone, and
the system controller, in operation:
   defines the second viewing zone located relative to the first MV display in the viewing zone coordinate system;
   associates a second quest related content with the second viewing zone based at least on the second attribute;
   for a second image generated from the second quest related content, using the mapping, identifies a second bundle of beamlets from the one or more MV pixels of the first MV display directed to the second viewing zone to form the second image, wherein the first bundle of beamlets directed to the first viewing zone to form the first image visible to the first quest player is different from the second bundle of beamlets directed to the second viewing zone to form the second image visible to the second quest player; and
   outputs second control signaling for the one or more MV pixels, the second control signaling defining color and brightness of each of the beamlets in the second bundle to project the second image to the second viewing zone.

3. The MVD quest system of claim 2, wherein the system controller associates the first and second quest related contents with the first and second viewing zones, respectively, based at least on the first and second attributes and an external attribute, which impacts the association of both the first and second quest related contents.

4. The MVD quest system of claim 3, wherein the external attribute is selected from a group consisting of a crowd size/flow related attribute, timing attribute, an environmental attribute, a content related attribute, and a content scaling/cropping attribute.

5. The MVD quest system of claim 1, wherein the first image is selected from a group consisting of a static image, a video, a text pattern, and a lighting pattern.

6. The MVD quest system of claim 1, wherein the first attribute includes one or more of: a presence of the first quest player, a location of the first quest player, a characteristic of the location of the first quest player, an aggregate characteristic of a team the first quest player belongs to, externally-observable characteristics of the first quest player, an externally-observable behavior of the first quest player, a path of travel followed by the first quest player, a speed of the first quest player, biometric information of the first quest player, demographic information of the first quest player, preferences of the first quest player, identity of the first quest player, information or indication inputted by the first quest player, quest history of the first quest player, a location of the first viewing zone, an environmental condition of the first viewing zone, and a characteristic of the first viewing zone.

7. The MVD quest system of claim 1, comprising a user-interface device which, in operation, receives an operator specification of the first attribute.

8. The MVD quest system of claim 1, comprising a sensing system, coupled to the input node, which, in operation, detects the first attribute.

9. The MVD quest system of claim 8, comprising a first player surrogate associated with the first quest player and communicable with the sensing system.

10. The MVD quest system of claim 9, wherein the first player surrogate is a smartphone, a personal computing device, or a radio tag readable by the sensing system.

11. The MVD quest system of claim 9, wherein the sensing system detects the first attribute based on the first player surrogate.

12. The MVD quest system of claim 9, wherein the first player surrogate includes a user-interface, via which the first quest player inputs the first attribute, which is transmitted from the first player surrogate to the sensing system.

13. The MVD quest system of claim 1, comprising one or more memory devices configured to store one or more of:
   contents, from which the system controller selects the first quest related content,
   interfaces that feed content from content providers, and
   computer-executable algorithms, which the system controller uses to generate the first quest related content.

14. The MVD quest system of claim 13, wherein the one or more memory devices, in operation, store a first set of attributes of the first quest player or of the first viewing zone, and the system controller, in operation, associates the first quest related content with the first viewing zone based at least on the first attribute received via the input node and the first set of attributes stored in the one or more memory devices.

15. The MVD quest system of claim 14, wherein the first set of attributes includes one or more of: a location of the first quest player, a characteristic of the location of the first quest player, an aggregate characteristic of a team the first quest player belongs to, externally-observable characteristics of the first quest player, an externally-observable behavior of the first quest player, a path of travel followed by the first quest player, a speed of the first quest player, biometric information of the first quest player, demographic information of the first quest player, preferences of the first quest player, identity of the first quest player, information or indication inputted by the first quest player, quest history of the first quest player, quest scores of the first quest player, a location of the first viewing zone, an environmental condition of the first viewing zone, and a characteristic of the first viewing zone.

16. The MVD quest system of claim 1, wherein the first quest related content is updated based on a third attribute of the first quest player or of the first viewing zone, received via the input node, to project an updated first image to the first quest player, which is different from the first image previously projected to the first quest player.

17. The MVD quest system of claim 1, comprising:
a second MV display including one or more MV pixels, wherein each one of the one or more MV pixels is configured to emit beamlets in different directions in a second beamlet coordinate system;
wherein
the input node, in operation, receives a third attribute of the first quest player or of a third viewing zone; and
the system controller, in operation:
defines the third viewing zone located relative to the second MV display in a second viewing zone coordinate system;
determines a second mapping that translates between the second viewing zone coordinate system and the second beamlet coordinate system;
associates a third quest related content with the third viewing zone based at least on the first and third attributes;
for a third image generated from the third quest related content, using the second mapping, identifies a third bundle of beamlets from the one or more MV pixels of the second MV display directed to the third viewing zone to form the third image; and
outputs third control signaling for the second MV display, the third control signaling defining color and brightness of each of the beamlets in the third bundle to project the third image to the third viewing zone.

18. The MVD quest system of claim 17, wherein the first quest related content visible to the first quest player at a first location in view of the first MV display is configured to facilitate a quest of the first quest player by inducing the first quest player to move to a second location, which is different from the first location and which is in view of the second MV display.

19. The MVD quest system of claim 1, which is employed in one or more of an entertainment venue, an amusement park, a gaming event, a retail venue, a resort venue, a cruise ship, a sports venue, a recreation venue, a cultural venue, a commercial event, a trade show, a promotional event, a marketing event, and a transportation venue/system.

20. A computer-implemented method of hosting a multi-view display (MVD) quest, the method comprising:
arranging a MVD quest system including: a first multi-view (MV) display including one or more MV pixels, wherein each one of the one or more MV pixels is configured to emit beamlets in different directions in a beamlet coordinate system; an input node; and a system controller, coupled to the first MV display and the input node;
the system controller receiving, via the input node, a first attribute of a first quest player or of a first viewing zone;
defining the first viewing zone located relative to the first MV display in a viewing zone coordinate system;
determining a mapping that translates between the viewing zone coordinate system and the beamlet coordinate system;
associating a first quest related content with the first viewing zone based at least on the first attribute;
for a first image generated from the first quest related content, using the mapping, identifying a first bundle of beamlets from the one or more MV pixels of the first MV display directed to the first viewing zone to form the first image; and
outputting first control signaling for the one or more MV pixels, the first control signaling defining color and brightness of each of the beamlets in the first bundle to project the first image to the first viewing zone.

21. The computer-implemented method of hosting an MVD quest according to claim 20, comprising:
the system controller receiving, via the input node, a second attribute of a second quest player or of a second viewing zone;
defining the second viewing zone located relative to the first MV display in the viewing zone coordinate system;
associating a second quest related content with the second viewing zone based at least on the second attribute;
for a second image generated from the second quest related content, using the mapping, identifying a second bundle of beamlets from the one or more MV pixels of the first MV display directed to the second viewing zone to form the second image, wherein the first bundle of beamlets directed to the first viewing zone to form the first image visible to the first quest player is different from the second bundle of beamlets directed to the second viewing zone to form the second image visible to the second quest player; and
outputting second control signaling for the one or more MV pixels, the second control signaling defining color and brightness of each of the beamlets in the second bundle to project the second image to the second viewing zone.

22. The computer-implemented method of hosting an MVD quest according to claim 20, implemented in one or more of an entertainment venue, an amusement park, a gaming event, a retail venue, a resort venue, a cruise ship, a sports venue, a recreation venue, a cultural venue, a commercial event, a trade show, a promotional event, a marketing event, and a transportation venue/system.

23. The computer-implemented method of hosting an MVD quest according to claim 20, implemented to facilitate one or more tasks involved in a quest including:
player and team assignment;
use of player devices;
matching a player with a player device;
distributing quest game materials;
directing players to begin their quest experiences;
managing player flow and distribution;
providing puzzles, clues and navigation;
acknowledging completion of a quest; and
rewarding a quest achievement with an effect.

* * * * *